US009037982B2

(12) United States Patent
Seo et al.

(10) Patent No.: US 9,037,982 B2
(45) Date of Patent: May 19, 2015

(54) APPARATUS AND METHOD FOR PROCESSING A MESSAGE USING AVATARS IN A WIRELESS TELEPHONE

(75) Inventors: Jeong-Wook Seo, Daegu (KR); Jae-Ho Kim, Gumi-si (KR); Wei-Jin Park, Seoul (KR); Chae-Whan Lim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 951 days.

(21) Appl. No.: 11/019,230

(22) Filed: Dec. 23, 2004

(65) Prior Publication Data

US 2005/0143108 A1 Jun. 30, 2005

(30) Foreign Application Priority Data

Dec. 27, 2003 (KR) .................. 10-2003-0098166
Jan. 20, 2004 (KR) .................. 10-2004-0004245
Aug. 19, 2004 (KR) .................. 10-2004-0065365

(51) Int. Cl.
*G06F 3/00* (2006.01)
*H04M 1/725* (2006.01)
*G06F 17/21* (2006.01)

(52) U.S. Cl.
CPC ......... *H04M 1/72544* (2013.01); *G06F 17/211* (2013.01); *H04M 1/72552* (2013.01)

(58) Field of Classification Search
USPC .................. 715/706, 758, 201, 752; 455/466; 709/202
See application file for complete search history.

(56) References Cited

U.S. PATENT DOCUMENTS

| 5,784,001 | A | * | 7/1998 | Deluca et al. ................ 340/7.56 |
| 5,880,731 | A | * | 3/1999 | Liles et al. .................... 715/758 |
| 6,044,248 | A | * | 3/2000 | Mochizuki et al. .......... 340/7.47 |
| 6,121,981 | A | * | 9/2000 | Trower et al. ................ 345/473 |
| 6,208,357 | B1 | * | 3/2001 | Koga et al. .................... 345/473 |
| 6,331,861 | B1 | * | 12/2001 | Gever et al. .................. 345/629 |
| 6,629,793 | B1 | * | 10/2003 | Miller .......................... 400/472 |
| 6,839,417 | B2 | * | 1/2005 | Weisman et al. ........ 379/204.01 |
| 6,943,794 | B2 | * | 9/2005 | Kamimura et al. .......... 345/473 |
| 7,173,979 | B1 | * | 2/2007 | Badri et al. ................... 375/308 |
| 7,231,205 | B2 | * | 6/2007 | Guyot et al. ............... 455/414.1 |
| 7,359,688 | B2 | * | 4/2008 | Seo et al. ..................... 455/218 |
| 7,478,047 | B2 | * | 1/2009 | Loyall et al. ................. 704/258 |

(Continued)

FOREIGN PATENT DOCUMENTS

DE 10135429 1/2003
JP 11-143862 5/1999

(Continued)

*Primary Examiner* — Amy Ng
*Assistant Examiner* — Meseker Takele
(74) *Attorney, Agent, or Firm* — Jefferson IP Law, LLP

(57) ABSTRACT

An apparatus and method are provided for transmitting a text message in a wireless terminal. The apparatus and method include displaying data input when creating a text message and analyzing the data in order to check whether the data are character display instruction words. Character image information corresponding to the character display instruction words is searched. The character image information is added to the display instruction words, and the display instruction words having the character image information are added to the text message. Character data are added to the text message if the data are general character data. The above steps are repeated and recipient information for the character text message is input when the character text message has been created. The created character text message is then transmitted.

22 Claims, 23 Drawing Sheets

(56) References Cited

U.S. PATENT DOCUMENTS

| | | | |
|---|---|---|---|
| 7,650,169 B2 * | 1/2010 | Seo et al. | 455/566 |
| 7,756,536 B2 * | 7/2010 | Camp, Jr. | 455/466 |
| 7,908,554 B1 * | 3/2011 | Blattner | 715/706 |
| 8,209,385 B2 * | 6/2012 | Partaker et al. | 709/206 |
| 2002/0156866 A1 * | 10/2002 | Schneider | 709/218 |
| 2002/0178228 A1 * | 11/2002 | Goldberg | 709/206 |
| 2003/0028604 A1 * | 2/2003 | Aktas et al. | 709/206 |
| 2003/0069936 A1 * | 4/2003 | Warner et al. | 709/206 |
| 2003/0154446 A1 * | 8/2003 | Constant et al. | 715/531 |
| 2004/0179039 A1 * | 9/2004 | Blattner et al. | 345/758 |
| 2005/0081150 A1 * | 4/2005 | Beardow | 715/531 |
| 2005/0116956 A1 * | 6/2005 | Beardow | 345/473 |
| 2007/0255807 A1 * | 11/2007 | Hayashi et al. | 709/219 |
| 2008/0163090 A1 * | 7/2008 | Cortright | 715/771 |
| 2012/0089692 A1 * | 4/2012 | Stoddard et al. | 709/206 |

FOREIGN PATENT DOCUMENTS

| | | |
|---|---|---|
| JP | 2001-265321 | 9/2001 |
| JP | 2001-350704 | 12/2001 |
| JP | 2002-032306 | 1/2002 |
| JP | 2002 132664 | 5/2002 |
| JP | 2002 007291 | 11/2002 |
| JP | 2004-072776 A | 3/2004 |
| KR | 1020040025438 A | 3/2004 |
| WO | 02/100121 | 12/2002 |
| WO | WO 02/100121 | 12/2002 |
| WO | 03/039169 | 5/2003 |

* cited by examiner

APPARATUS AND METHOD FOR PROCESSING A MESSAGE USING AVATARS IN A WIRELESS TELEPHONE

This application claims the benefit of priority under 35 U.S.C. §119(a) to an application entitled "Method For Processing Message Using Avatars In Wireless Telephone", filed with the Korean Intellectual Property Office on Dec. 27, 2003 and assigned Serial No. 2003-98166, and to applications filed with the Korean Intellectual Property Office on Jan. 20, 2004 and Aug. 19, 2004 and assigned Serial Nos. 2004-4245 and 2004-65365, respectively, the entire contents of all three applications being incorporated herein by reference.

BACKGROUND OF THE INVENTION

1. Field of the Invention

The present invention relates to an apparatus and method for processing a message in a wireless terminal. More particularly, the present invention relates to an apparatus and method for visually displaying a message by analyzing the contents of the message.

2. Description of the Related Art

Recently, wireless terminals have become equipped with various functions in addition to a simple telephone function. One of such various functions is a photographing function using a camera attached to a wireless terminal. A user can obtain image data by using the camera and can edit and transmit the image data. That is, wireless terminals have developed into multi-purpose wireless terminals capable of performing a communication function and providing visual expression. Such a multi-purpose wireless terminal can represent an operational state and various functions of the complex wireless terminal by using character images.

The wireless terminal having the character image display function can visually express text messages by using the character images. A conventional wireless terminal only has a function of simply displaying a text message in a display section. That is, upon receiving a text message from a transmitting wireless terminal, a receiving wireless terminal sounds an alarm indicating a user of the arrival of an incoming text message and simply displays the text message in the display section. However, an avatar wireless terminal can visually express the content of the text message. That is, upon receiving the text message, the avatar wireless terminal may analyze the content of the text message in order to determine whether the text message includes information which can be represented with character images. If the text message includes such information, the avatar wireless terminal displays the text message with character images. Therefore, the avatar wireless terminal can visually display the text message with character images.

SUMMARY OF THE INVENTION

Accordingly, the present invention has been made to solve the above-mentioned problems occurring in the prior art, and an object of the present invention is to provide an apparatus and method of visually displaying a text message with a character image in a wireless terminal.

Another object of the present invention is to provide an apparatus and method of creating and sending a text message including information, which can be represented with a character image, in a wireless terminal.

Still another object of the present invention is to provide an apparatus and method of analyzing a text message and visually displaying the text message with a character image when the text message includes information, which can be represented by the character image, in a wireless terminal.

Still another object of the present invention is to provide an apparatus and method of creating and sending a text message including information, which can be represented with a character image, in a transmitting wireless terminal and analyzing and visually displaying the text message with the character image when the text message includes such information in a receiving wireless terminal.

Still another object of the present invention is to provide an apparatus and method of analyzing a text message and visually displaying the text message with an emotional character image based on the content of the text message in a wireless terminal including at least two emotional character images.

Still another object of the present invention is to provide an apparatus and method of displaying a text message with an emotional character image by searching a specific word or a character string contained in the text message received in a wireless terminal.

Still another object of the present invention is to provide an apparatus and method of analyzing a text message and displaying the text message together with a character image if the text message includes specific character data in a wireless terminal including character images and character data for representing the character images.

Still another object of the present invention is to provide an apparatus and method of registering character images capable of expressing at least two emotional models and letters or character strings capable of representing the character images, and displaying a text message together with an emotional character image when a specific word or a character string corresponding to the emotional character image is detected from the text message received in a wireless terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

In the following description, the term "text message" includes a short message service (SMS) message, an E-mail service (EMS) message, and a multimedia mail service (MMS) message. In addition, the text message signifies alphanumeric data messages and general text messages which can be displayed in a wireless terminal using letters and/or non-image characters.

In addition, the term "character" represents a specific image or image data displayed with the text message such as avatars, flowers, furniture and animals displayed with the avatars, and item images. The following description will be explained on the assumption that the character is the avatar.

Character data contained in the text message signify data for displaying characters, such as emoticons or emotional characters, with the text message. In the following description, specific character data for displaying avatar images are referred to as character display instruction words or avatar display instruction words.

The text message may include at least two avatar display instruction words. In this case, avatars are displayed corresponding to avatar display instruction words contained in the text message and the avatar can be displayed with regard to a representative avatar display command by analyzing the text message. The text message including the character (avatar) display instruction word will be referred to as a character text message or an avatar text message. The former will be described in first and second embodiments of the present invention, and the latter will be described in a third embodiment of the present invention.

Figure 1:
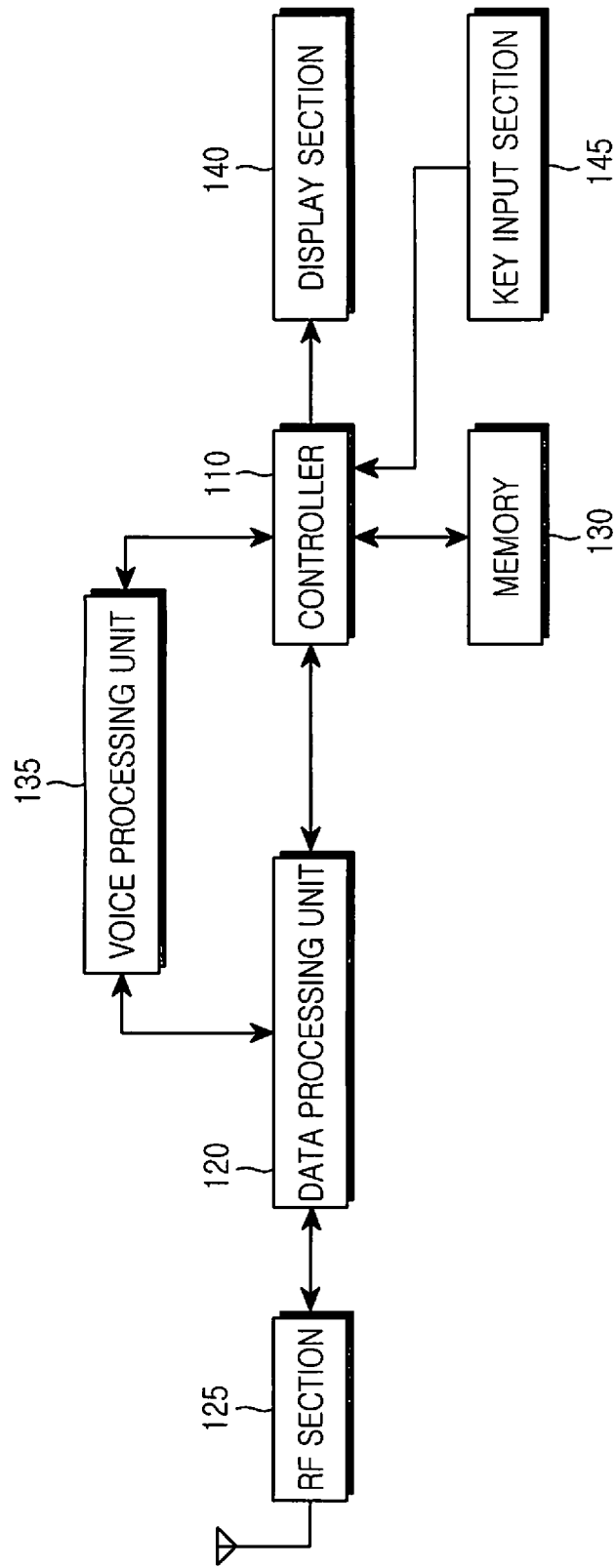
FIG. 1 is a view illustrating a structure of a wireless terminal according to an embodiment of the present invention.

FIG. 1 is a view illustrating a structure of a wireless terminal according to an embodiment of the present invention.

Referring to FIG. 1, a radio frequency (RF) section 125 performs a wireless communication function for the wireless terminal. The RF section 125 includes an RF transmitter (not shown) for up-converting and amplifying a frequency of a transmitted signal and an RF receiver (not shown) for low-noise amplifying and down-converting a frequency of a received signal. A data processing unit 120 includes a transmitter for coding and modulating the transmitted signal and a receiver for decoding and demodulating the received signal. That is, the data processing unit 120 includes a MODEM and a CODEC. A voice processing unit 135 converts text data output from a controller 110 into a voice signal.

A key input section 145 includes various functional keys for inputting numbers and character data and for setting various functions. In addition, avatars can be created by using the key input section 145. As mentioned above, the avatar display instruction word includes emoticons and character data representing emotional expression.

A memory 130 includes a program memory and a data memory. The program memory stores programs used for processing a call for the wireless terminal and programs used for displaying avatars based on avatar display data according to an embodiment of the present invention. The data memory temporarily stores data generated while executing the programs. In addition, the data memory includes a character memory for storing character (avatar) images capable of expressing emotion according to the avatar display data contained in the text message and a character display instruction word memory for storing avatar display instruction words used for displaying the character images.

The controller 110 controls an operation of the wireless terminal. In addition, the controller 110 may include the data processing unit 120. That is, in the case of the wireless terminal, the controller 110, the data processing unit 120, and the voice processing unit 135 can be integrally formed as an MSM chip. According to one embodiment of the present invention, the controller 110 analyzes the text message received in the wireless terminal and displays the text message and a predetermined avatar represented by a predetermined motion, a predetermined expression or a predetermined object corresponding to the avatar display instruction word if the text message includes the avatar display instruction word. As mentioned above, the avatar display instruction word includes emoticons or avatar display characters.

A display section 140 displays a state of the wireless terminal under the control of the controller 110. The display section 140 may include a Liquid Crystal Display (LCD). That is, the display section 140 may include a LCD controller, a memory for storing display data, and a LCD device. If the LCD is embodied as a touch screen type LCD, the LCD may act as an input section.

The present invention provides three embodiments for processing the text message. According to a first embodiment of the present invention, an avatar wireless terminal creates and transmits a text message including avatar display instruction words and displays an avatar image together with the text message by determining whether the text message received in the wireless terminal includes the avatar display instruction words. According to a second embodiment of the present invention, the avatar wireless terminal analyzes the text message received therein in order to determine whether the text message includes the avatar display instruction words and displays the avatar message together with the text message when the text message includes the avatar display instruction words. According to a third embodiment of the present invention, a transmitting wireless terminal transmits the text message by adding the avatar display instruction words for the avatar images to the text message and a receiving potable terminal displays the text message with the avatar image by checking the avatar display instruction words. Herein, the avatar display instruction words are data for displaying the avatar image with the text message and include character data and symbol data (hereinafter, referred to as emoticons). That is, the avatar display instruction words are character data (or, symbol data) included in the text message in order to select the avatar image to be displayed and are displayed in the display section 140 as a content of the text message.

First, a procedure for displaying an avatar according to first and second embodiments will be described. According to the first embodiment of the present invention, a user of a transmitting wireless terminal creates a text message including an avatar display instruction word corresponding to an avatar image to be displayed. Upon receiving the request for sending the text message from the user, the transmitting wireless terminal sends the text message as an avatar text message. Upon receiving the text message from the transmitting wireless terminal, a receiving wireless terminal determines the avatar display instruction words contained in the text message and sets the display time for the avatars with regard to the avatar display instruction words. Then, the receiving wireless terminal displays the text message together with the avatars. According to the second embodiment of the present invention, after checking the avatar display instruction words contained in the text message, the receiving wireless terminal sets the display time for the avatars with regard to the avatar display instruction words and displays the text message together with the avatars. In order to realize the first and second embodiments of the present invention, the wireless terminal preferably includes an avatar memory and a display instruction word memory as follows:

Referring to FIG. 1, a data memory of the memory 130 includes the character memory (hereinafter, referred to as an avatar memory) and the character display instruction word memory (hereinafter, referred to as a display instruction word memory).

Figure 2A:
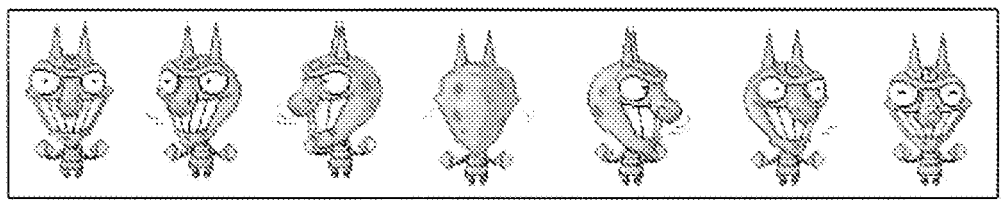
FIGS. 2A to 2G are views illustrating avatar images according to an embodiment of the present invention.
Figure 2B:
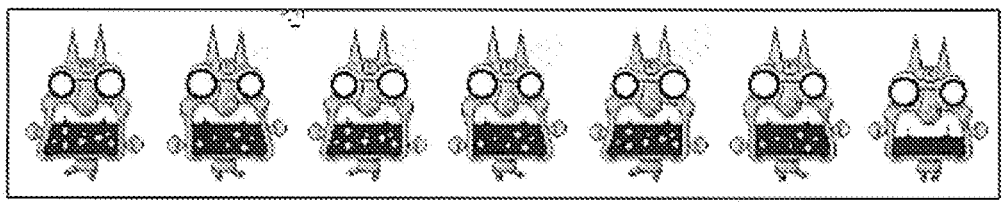
Figure 2C:
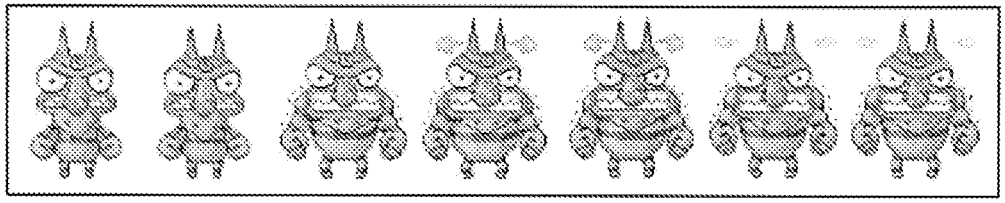
Figure 2D:
Figure 2E:
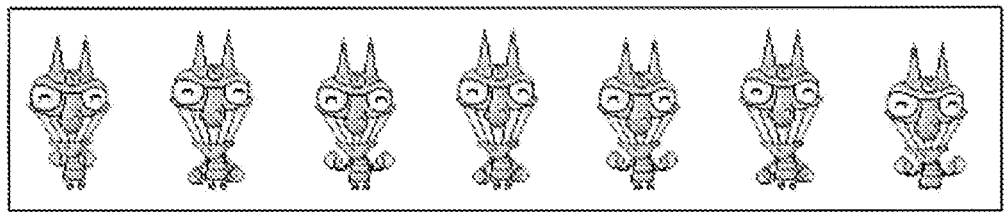
Figure 2F:
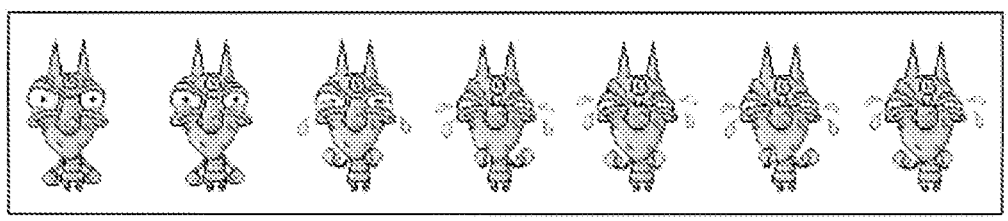
Figure 2G:
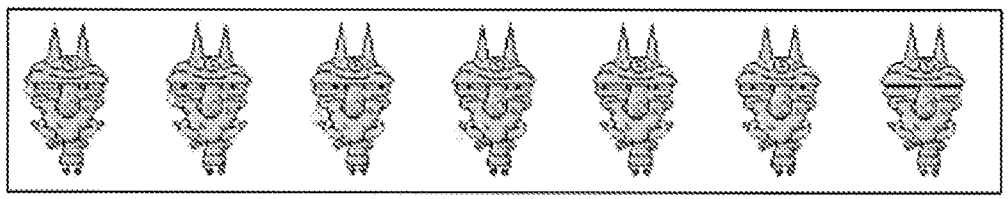

The avatar memory acts as a file system and includes a memory (or, file system) index per each avatar. In addition, the avatar memory can store avatars having various motions, expressions, and so on. That is, avatar information is stored in the avatar memory such that various types of avatars with various motions, expressions, and so on can be individually displayed. FIGS. 2A to 2G are views illustrating avatar images stored in the avatar memory. FIG. 2A illustrates avatars corresponding to display instruction words of "love", "happy" and "smile", FIG. 2B illustrates avatars corresponding to display instruction words of "surprise" and "confusion", FIG. 2C illustrates avatars corresponding to display instruction words of "angry" and "jealous", FIG. 2D illustrates avatars corresponding to display instruction words of "boring" and "tired", FIG. 2E illustrates avatars corresponding to a display instruction word of "normal", FIG. 2F illustrates avatars corresponding to display instruction words of "sad", and "cry", and FIG. 2G illustrates avatars corresponding to a display instruction word of "anxiety". FIGS. 2A to 2G show avatar images corresponding to exemplary display instruction words. Various avatar images can be provided corresponding to the display instruction words. In addition, the avatar images shown in FIGS. 2A to 2G correspond to predetermined avatar display instruction words and are displayed in the form of an animation if the text message includes the avatar display instruction words. In addition, it is also possible to display the avatar display instruction words in the form of a single avatar image, instead of the animation.

The display instruction word memory stores the avatar display instruction words for displaying the avatars as shown in FIGS. 2A to 2G. As mentioned above, the avatar display instruction words include emoticons comprising special symbolic characters and character data expressing emotional states. According to the first and second embodiments of the present invention, the avatars are displayed with various motions, expressions and things. However, it is also possible to display the avatars with other characters.

Tables 1 to 5 show avatar display instruction words for displaying avatars with various motions, expressions and things. Tables 1 and 2 show avatar display instruction words (emoticons and characters) for displaying avatars with various motions, Tables 3 and 4 show avatar display instruction words (emoticons and characters) for displaying avatars with various expressions, and Table 5 shows avatar display instruction words (emoticons) for displaying avatars with various things. In addition, the names of objects shown in Table 5, such as flower, scissors, cigarette, television, knife, and candy, can be used as display instruction words (characters) for representing the objects. Accordingly, Tables 1, 3 and 5 show emoticons for representing the avatars with motions, expressions or objects, and Tables 2, 4 and 5 shows characters for representing the avatars with motions, expressions or objects.

TABLE 1

| Avatar motion | Emoticons | | | |
|---|---|---|---|---|
| Dancing | (--)(--) | | (Y)(Y)(Y) | |
| Staring around | (")(")(") | | (' '_)(..) | |
| Hugging | [ ] | | | |
| Hurrahing | !o! | | /o/ | |

TABLE 2

| Avatar motion | Reserved words | | | |
|---|---|---|---|---|
| Dancing | Singing | Dancing | Night club | Dance |
| Hugging | Hugging | | | |
| Eating | Eating | Meal | | |
| Calling | Calling | Telephone | | |

TABLE 3

| Avatar expressions | Emoticons | | | | |
|---|---|---|---|---|---|
| Smiling | ^^ | ^.^ | ^_^ | ^0^ | ^o^ |
|  | ^)^ | ^(^ | ^ ^ | ^*^ | ^_^ |
|  | :-) | :) | =-) | | |
| Smiling with flushed cheek | *^^* | ^.^ | *^_^* | (*^_^*) | |
| Smiling with sweat | ^^; | ^^;; | -_-oo | | |
| Wink | *.-) | ^.~ | ^.- | ^_+ | +_^ |
|  | (-_o) | :] | ^_~ | ;> | ;-D |
| Surprise | ★.★ | ⊙.⊙ | !.! | =-o | :-o |
| Angry | >.< | >:-@ | | | |
| Crying | TT.TT | T.T | T.T | t.t | :-( |
| Drowsy | -o- | (z_z) | =.= | -.-zzz | :-(0) |
| Tired | ∃.∈ | -* -* | | | |
| Laugh loudly | :) | => | :-D | :D | |

TABLE 4

| Avatar things | Reserved words | | |
|---|---|---|---|
| Smiling | Happy | Joy | |
| Angry | Angry | | |
| Wink | Love | | |
| Surprise | Afraid | Surprise | Novel |
| Tired/drowsy | Drowsy | Sleep | |

TABLE 5

| Avatar things | Emotions | | |
|---|---|---|---|
| Flower | @}->-- | @}--;-- | @}-^---,- |
| Scissors | 8× | 8< | |
| Cigarette | =**: | =====:::? | |
| Television | >[>[]| | | |
| Knife | =)--- | -|---- | |
| Candy | >(*/*)< | >L (///)< | |

A text message communication method according to an embodiment of the present invention may vary depending on the sort of potable terminals.

In a case of an avatar wireless terminal, the text message can be transmitted through two transmission schemes. As mentioned above, the text message includes an SMS message, an EMS message, and an MMS message. In addition, the text message can be transmitted through various transmission schemes other than the above two transmission schemes. The avatar wireless terminal can separately form a general text message menu and an avatar text message menu in a menu item. In this case, if a user of the avatar wireless terminal selects the avatar text message menu and inputs a text message including instruction words for the avatars, the controller 110 detects it and creates the text message based on data input by the user. At this time, the controller 110 may display information indicating that the data input by the user are avatar display instruction words. After creating the text message, the controller 110 displays items inquiring of the user whether the text message must be displayed with the avatar or not. At this time, if the user selects an item requesting display of the text message with the avatar, the controller 130 displays avatar images together with the text message corresponding to the instruction words included in the text message based on the instruction words stored in the memory 130. However, if the user selects an item requesting transmission of the text message without displaying the avatar, the controller 110 transmits the text message through the data processing unit 120 and the RF section 125.

In addition, if the user inputs the text message after selecting the general text message menu, the controller 110 creates the text message based on the data input by the user. In this state, if the user operates a send button to transmit the text message, the controller 110 transmits the text message through the data processing unit 120 and the RF section 125. In order to transmit the text message, the user inputs information related to a telephone number or an E-mail ID of a recipient after creating the text message. Then, the controller 110 detects it and transmits the text message.

The avatar wireless terminal can display the avatar text message and the general text message received in the avatar wireless terminal. If the avatar text message is received in the avatar wireless terminal, the controller 110 analyzes the display instruction words contained in the avatar text message and displays the avatar together with the text message by selecting the avatar corresponding to the analyzed display instruction words. At this time, the controller 110 checks the avatars represented with various motions, expressions or things as shown in Tables 1 to 5 according to the input display instruction words by accessing the display instruction word memory of the memory 130. In addition, the controller 110 determines position information (address values) of the avatars from the avatar memory of the memory 130 having the avatar images and selects the avatar images corresponding to the input display instruction words.

Figure 3:
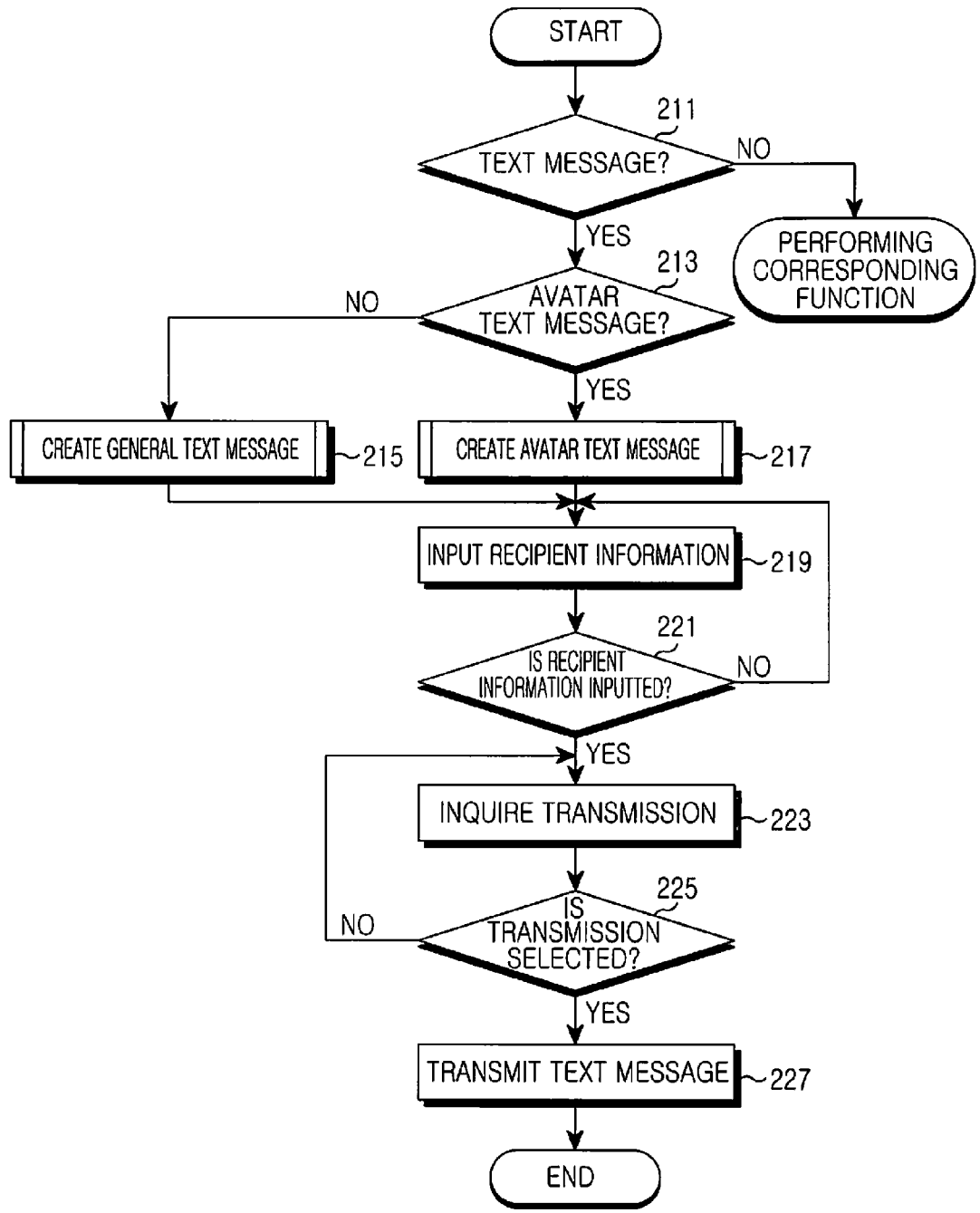
FIG. 3 is a flowchart illustrating a procedure for transmitting an avatar message in a wireless terminal according to an embodiment of the present invention.

The avatar wireless terminal according to the first embodiment of the present invention can create and transmit the text message including the instruction words for selecting the avatar images. FIG. 3 is a flowchart illustrating a procedure for creating and transmitting an avatar message in the avatar wireless terminal according to the first embodiment of the present invention.

Referring to FIG. 3, if the user selects a text message function, the controller 110 detects it in step 211 and displays a menu for allowing the user to select the type of text messages. If the user does not select the text message function in step 211, the controller performs a corresponding function in step 228. However, if the user selects the general text message, the controller 110 detects it in step 213 and performs a procedure for creating the general text message in step 215. However, if the user selects the avatar text message, the controller 110 detects it in step 213 and performs a procedure for creating the avatar text message in step 217. The procedure for creating the avatar text message will be described later in detail with reference to FIGS. 4 and 5.

After creating the text message in step 215 or 217, the controller 110 displays information about recipients for receiving the text message in step 219. The recipient information includes telephone numbers or E-mail information of the recipients. When the recipient information has been input, the controller 110 detects it in step 221 and inquires of the user about the transmission of the text message in step 223. At this time, if the user requests the transmission of the text message, the controller 110 detects it in step 225 and transmits the text message in step 227.

The avatar wireless terminal can transmit the avatar text message through two transmission schemes. First, the avatar wireless terminal can transmit the avatar text message by adding avatar selection information to the text message if the avatar text message includes the avatar display instruction words. In addition, the avatar wireless terminal can transmit the avatar text message together with a motion list of the avatars. However, such avatar information is unnecessary if the wireless terminal of the recipient cannot display the avatar text message. Accordingly, the transmitting avatar wireless terminal analyzes recipient information so as to selectively transmit the avatar text message or the general text message. That is, when the user of the avatar wireless terminal registers information about the recipient in a phone book, information about the sort of the wireless terminals of the recipient is also registered. In addition, when inputting the recipient information for transmitting the text message, the avatar wireless terminal can display the information about the sort of the wireless terminals of the recipient. Thus, the controller of the avatar wireless terminal analyzes the recipient information in step 225 and selectively transmit the avatar text-message or the general text message to the recipient.

Hereinafter, the procedure for creating the avatar text message will be described.

Figure 4:
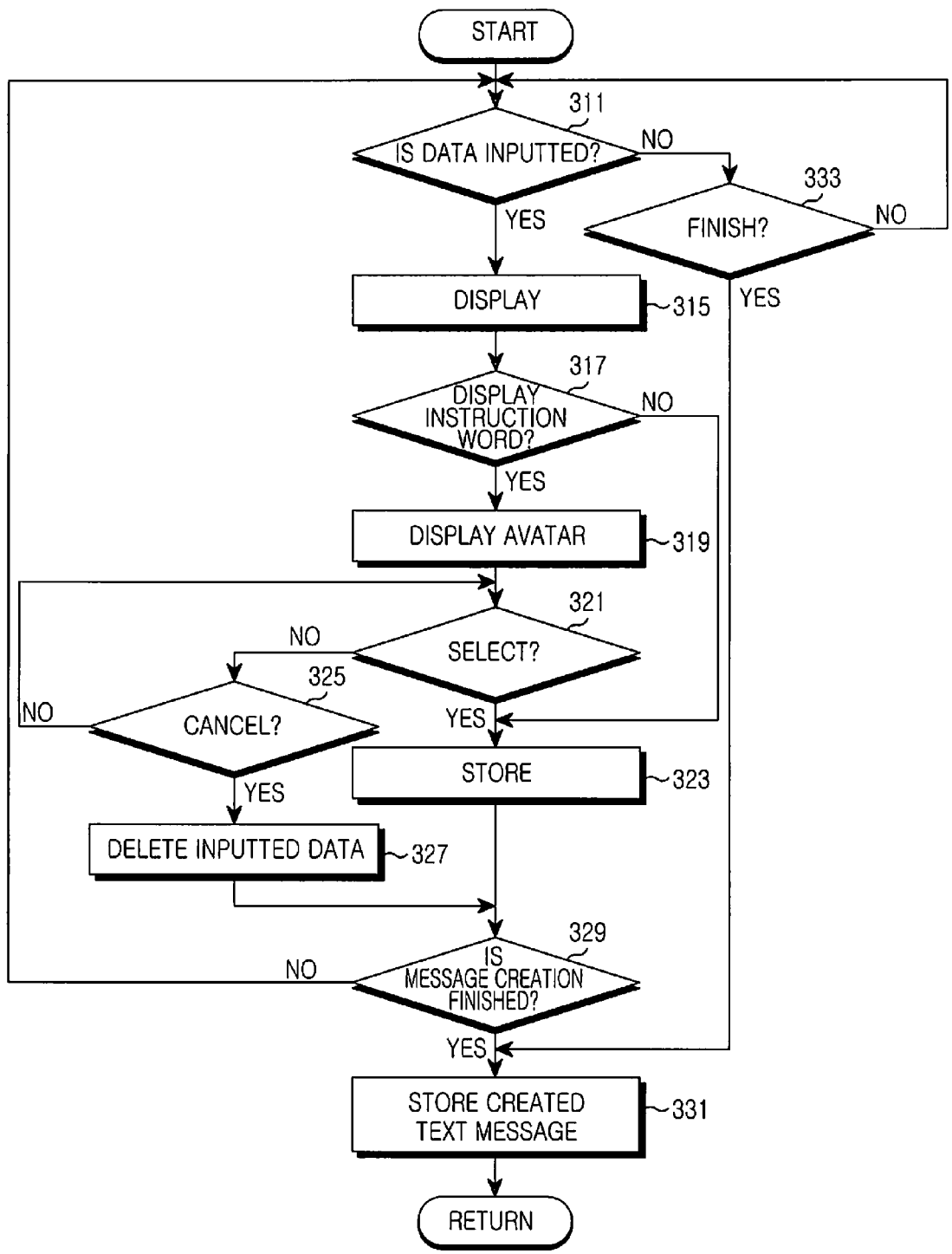
FIG. 4 is a flowchart illustrating a procedure for creating an instruction word shown in FIG. 3 according to an embodiment of the present invention.

FIG. 4 is a flowchart illustrating the procedure for creating the avatar text message in the avatar wireless terminal according to an embodiment of the present invention.

Referring to FIG. 4, if the user inputs data by using a key input section 145, the controller 110 determine whether the data are for creating the text message in step 311. If the data are for creating the text message, the controller 110 displays the input data in the display section 140 in step 315. Then, the controller 110 determines whether the input data are display instruction words (avatar display instruction words) for selecting the avatars in step 317. If the input data are not the display instruction words, the controller 110 detects it in step 317 and stores the displayed text message in step 323.

If the data are input in step 317, the controller 110 compares the data with the display instruction words as shown in Tables 1 to 5 stored in the memory 130. In addition, if the input data matches one of the display instruction words shown in Tables 1 to 5 stored in the memory 130, the controller 110 determines in step 317 that the data are avatar display instruction words, so the controller 110 selects the avatars corresponding to the avatar display instruction words and displays the avatars in the display section 140 in step 319. At this time, the selected avatars can be represented with various motions, expressions or objects according to the display instruction words. As shown in Tables 1 to 5, the display instruction words include character data or emoticons comprising special symbols. Such display instruction words are stored in the display instruction word memory section of the memory 130. In addition, the display section 140 may display the avatars in a predetermined area thereof with a small display screen or overlays the avatars on the text message.

In this state, the controller 110 inquires of the user about the selection of the avatar. That is, the user can select or cancel the avatar displayed in the display section 140. At this time, if the user selects the avatar displayed in the display section 140, the controller 110 detects it in step 321 and temporarily stores the text message by adding the display instruction words to the text message in step 323. When adding the display instruction words to the text message in step 323, the controller 110 may add information on the avatar to be displayed to the text message. However, if the user selects the cancel function in step 325 while the avatar is being displayed in the display section 140, the controller deletes the input instruction words in step 327.

The avatar wireless terminal stores input data while repeatedly performing the above procedures, thereby creating the text message. If an end command is generated while the text message is being created, the controller 110 detects it in step 329 and stores the created text message in step 331.

The text message may be created in the form of the avatar text message or the general text message. The general text message includes data input by the user and the avatar text message includes data input by the user and control information added to the data so as to allow the user to select the avatar corresponding to the display instruction words. If the text message input by the user is "Hi! How have you been? I was tired today, but I have much homework to do. That teases me. I watched horror movie today, and I was so scared.", the avatar display instruction words may include "tired", "tease" and "scared". At this time, if the avatar image representing "tired" is a1, the avatar image representing "tease" is a2, and the avatar image representing "scared" is a3, the avatar text message is represented as "W avatar msg Hi! How have you been? I was $a1tired$today, but I have much homework to do. That $a2teases$ me. I watched horror movie today, and I was so $a3scared$." Herein, "W avatar msg" is an instruction word representing the avatar text message, "$" is an instruction word representing the display instruction word, and "a1 to a3" is an avatar image corresponding to the display instruction word. Such an avatar text message is available only when the receiving wireless terminal is the avatar wireless terminal. If the receiving wireless terminal is not the avatar wireless terminal, "W avatar msg", "$", and "a1 to a3" may be displayed as unnecessary character data in the receiving wireless terminal. Therefore, if the receiving wireless terminal is not the avatar wireless terminal, it is preferred to transmit the text message of the user without avatars.

In addition, before the avatar text message has been transmitted, the user of the transmitting wireless terminal can check the avatar text message written by the user. Therefore, if the user confirms the created avatar text message, the controller 110 displays the created text message with the avatar according to the instruction words contained in the text message.

Figure 5:
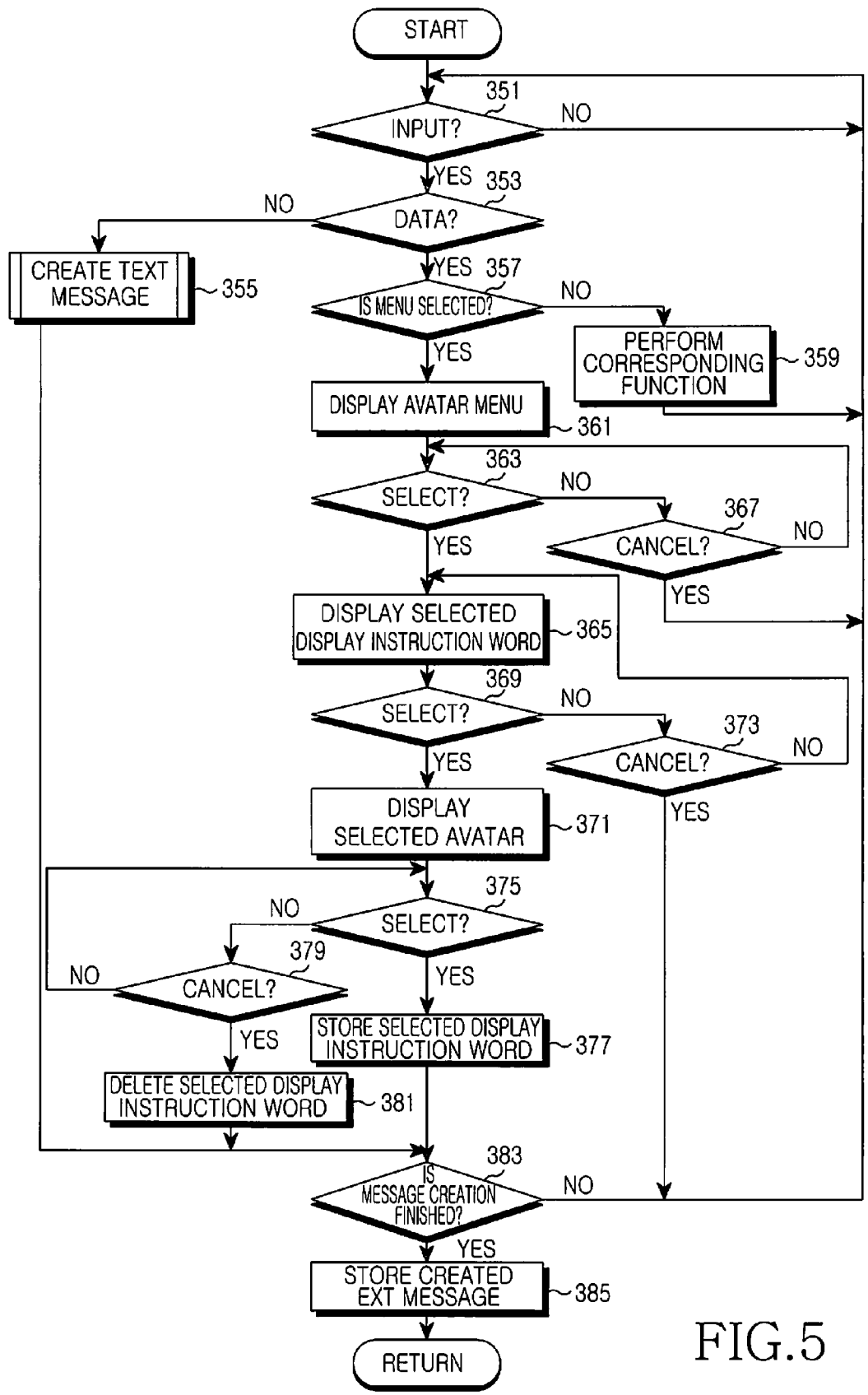
FIG. 5 is a flowchart illustrating a procedure for creating an instruction word shown in FIG. 3 according to another embodiment of the present invention.

According to the procedure for creating the avatar text message shown in FIG. 4, the user of the transmitting wireless terminal may create the text message by adding the display instruction words for selecting the predetermined avatars to the text message, in such a manner that the text message can be displayed together with the avatars, thereby allowing the user to check the motion of the avatar represented with the text message. In addition, since there are many instruction words used for displaying the avatars, it is difficult for the user to remember instruction words. Therefore, it is necessary for the user to check and select the avatar instruction words while the avatar text message is being created. FIG. 5 is a flowchart illustrating a procedure for creating the text message including the instruction words while allowing the user to check the avatar display instruction words during the process for creating the avatar message.

Referring to FIG. 5, if an input of the user is generated through the key input section 145, the controller 110 detects it in step 351 and checks whether the input of the user is a data input in step 353. Herein, the data input may be performed by using the character data for creating the avatar text message or the display instruction words. Upon receiving the data, the controller 110 detects it in step 353 and stores the data while displaying the data in the display section 140 in step 355. The procedure for creating the text message in step 355 may be identical to the procedure shown in FIG. 4.

The controller 110 performs a corresponding function in step 359 if a menu is not selected in step 357. However, if the input data are information for selecting a menu, the controller 110 detects it in step 357 and displays the menu in the display section 140 in order to allow the user to input the avatar display instruction words in step 361. The information displayed in the display section in step 361 includes information related to the motion, expression and objects of the avatar. If the user selects one of the motions, expressions and objects of the avatar, the controller 110 detects it in step 363 and displays the selected avatar display instruction words in step 365. That is, if the user selects the motion of the avatar, the controller 110 displays emoticons as shown in Table 1 and displays instruction words for operating the avatars as shown in Table 2. In addition, if the user selects the expression of the avatar, the controller 110 displays emoticons as shown in Table 3 and displays instruction words for operating the avatars as shown in Table 3. Also, if the user selects the objects of the avatar, the controller 110 displays display instruction words for operating the avatars as shown in Table 5. In addition, the controller 110 allows the user to select the avatar display instruction words in steps 363 and 369 and displays the selected avatar display instruction words when the user selects the avatar display instruction words. However, if a cancel command is generated before the user selects the avatar display instruction words, the controller 110 detects it in step 367 or 373. Thus, the controller 110 stops the display instruction word input step and returns to step 351 for the next process.

However, if the user selects a specific display instruction word while the display instruction words are being displayed in step 365, the controller 110 detects it in step 369 and displays the avatar corresponding to the specific display instruction word in step 371. At this time, the avatar may be displayed with various motions, expressions or things. After that, if a selection command is generated by the user while the avatar is being displayed in the display section 140, the controller 110 detects it in step 375, and stores the selected instruction word together with data representing the instruction word in step 377. However, if the user selects the cancel function while the avatar is being displayed in the display section 140, the controller 110 detects it in step 379 and deletes the selected instruction word in step 381.

The avatar wireless terminal can create the avatar text message while repeatedly performing the above procedures. In addition, if an end command is generated after the avatar text message has been created, the controller 110 detects it in step 383, stores the created text message in step 385 and returns to an initial stage. At this time, the created avatar text message includes the instruction word representing the avatar text message and the text message including information for allowing the user to select the avatar images corresponding to the display instruction words. As mentioned above, if the user confirms the created text message, the controller 110 displays the created text message together with the avatar corresponding to the instruction word included in the text message.

Upon receiving the avatar text message transmitted from the transmitting avatar wireless terminal, the receiving avatar wireless terminal analyzes the text message and displays the text message together with the avatar if the text message includes the avatar display instruction word. In addition, the receiving avatar wireless terminal can display the text message together with the avatar even if the text message is transmitted thereto from the general wireless terminal. This is because the receiving avatar wireless terminal has the display instruction words as shown in Tables 1 to 5. That is, upon receiving the text message from the general wireless terminal, the receiving wireless terminal analyzes the content of the text message and displays the text message together with the avatar corresponding to the instruction words if the text message includes the instruction word for operating the avatar. Although the present invention has been mainly described in relation to the procedure for processing the avatar text message in the avatar wireless terminal, the procedure of the present invention is also applicable when processing the general text message.

Figure 6:
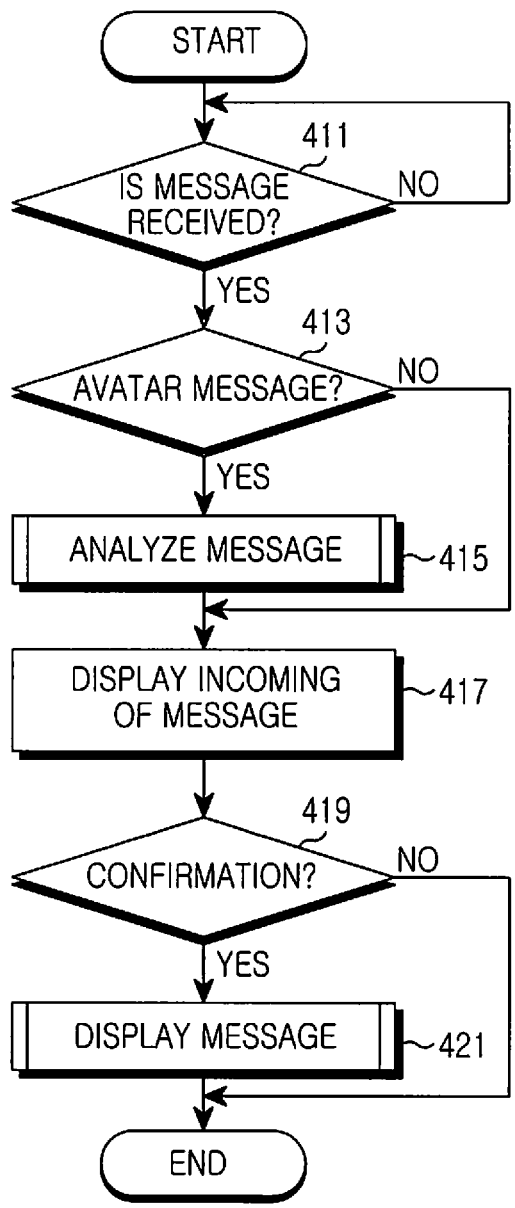
FIG. 6 is a flowchart illustrating a procedure for displaying an avatar message in a wireless terminal according to an embodiment of the present invention.

FIG. 6 is a flowchart illustrating a procedure for displaying an avatar message in a wireless terminal according to the first embodiment of the present invention.

Referring to FIG. 6, upon receiving the text message through the RF section 125 and the data processing unit 120, the controller 110 detects it in step 411 and checks whether the text message is the avatar text message in step 413. At this time, the transmitting avatar wireless terminal may transmit the text message to the receiving avatar wireless terminal by adding a control message representing the avatar text message to the text message. In addition, even if the text message does not include the control message representing the avatar text message, the receiving avatar wireless terminal can detect whether the text message is the avatar text message by analyzing the instruction word included in the text message. In addition, the receiving avatar wireless terminal has a text message menu including an avatar text message item and a general text message item so as to selectively display the avatar text message or the general text message according to the selection of the user. The controller 110 determines the processing scheme for the text message received therein through one of the above methods. According to the first embodiment of the present invention, it is assumed that the text message is only displayed in the same manner as the conventional method if the general text message has been received in the receiving avatar wireless terminal. Accordingly, if it is determined that the received message is the general text message, the controller 110 detects it in step 413 and processes the received text message through the conventional method in step 415. That is, upon detecting the general text message in step 413, the controller 110 registers the incoming of the text message in a receive message list in step 417 while displaying the incoming of the text message in the display section 140 and sounds an alarm for the text message according to an alarm mode. At this time, the alarm for the text message may be generated through a ringing sound, a melody, or vibration. Then, if it is required by the user to confirm the message, the controller 110 detects it in step 419 and performs a character message service procedure for displaying the received text message in the display section 140 in step 421.

However, if it is determined in step 413 that the received message is the avatar text message, the controller 110 analyzes the received avatar text message in step 415 so as to register the avatar image in an operation list and registers the incoming of the avatar text message in the receive message list. At the same time, the controller 110 displays an icon representing the incoming of the avatar text message in the display section 140 and sounds an alarm according to a predetermined alarm mode. Herein, the avatar wireless terminal can individually form the receive message list for the general text messages and the receive message list for the avatar text messages, or can integrally form only the receive message list for the general text messages and the avatar text messages. If the receive message list is integrally formed, the general text messages registered in the receive message list must be discriminated from the avatar text messages registered in the receive message list by assigning different icons to the general text messages and the avatar text messages. In addition, the icons displayed in the display section 140 in step 417 for representing the arrival of the general text message are different from the icons used for representing the arrival of the avatar text messages. At this time, if the display section 140 has no an area for displaying a plurality of icons representing the incoming of the text messages, the icon can be displayed with various colors in order to distinguish the arrival of the avatar text messages from the arrival of the general text messages. For instance, the icon displayed with a black color represents the incoming of the general text message, the icon displayed with a blue color represents the incoming of the avatar text message, and the icon displayed with a red color represents the incoming of both avatar text message and general text message.

Figure 7:
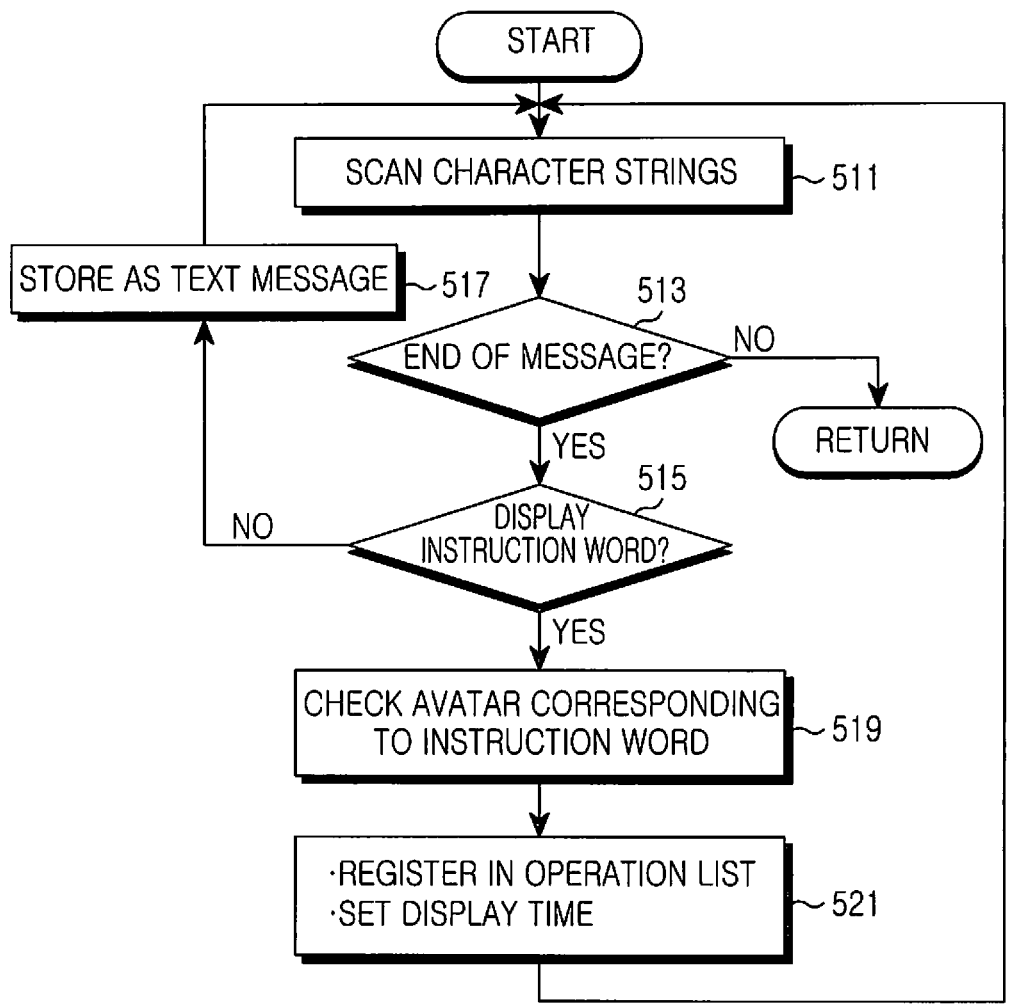
FIG. 7 is a flowchart illustrating a procedure for analyzing the content of a text message received in a wireless terminal shown in FIG. 5.

The procedure for analyzing the message shown in step 415 of FIG. 6 is identical to the message analyzing procedure shown in FIG. 7. In addition, the procedure for displaying the message shown in step 421 in FIG. 6 identical to the message displaying procedure shown in FIG. 7.

FIG. 7 is a flowchart illustrating a procedure for analyzing the content of the text message received in the wireless terminal according to one embodiment of the present invention.

Referring to FIG. 7, the controller 110 scans character strings contained in the received text message in step 511 and checks the scanned character data in step 513. The character data include general text data forming the text message, control information indicating the display instruction word, and avatar image information displayed according to the display instruction word. Therefore, the controller 110 checks whether the scanned data are the general character data, the control information indicating the display instruction word, or the avatar image information while scanning the character strings in step 515. At this time, if it is determined in step 515 that the scanned data are general character data, the controller 110 stores the general character data so as to display the general character data in the display section 140 in step 517 and returns to step 511.

However, if it is determined in step 515 that the scanned data are display instruction words, the controller 110 analyzes the control information for the display instruction words together with the avatar image information, thereby determining a display scheme for the avatars in step 519. In addition, the controller 110 registers the avatar information corresponding to the display instruction words in the operation list and sets display time in step 521. In addition, the controller 110 stores the display instruction words so as to display the display instruction words in the display section 140 and returns to step 511. That is, the display instruction words detected in step 515 are distinguished from the general character data contained in the text message. As described with reference to FIG. 4, the display instruction words contained in the avatar text message include a first identifier ($), avatar information (an), display instruction words (character data or emoticons), and a second identifier ($). Therefore, if the controller 110 detects the identifier, the controller 110 regards it as the display instruction word in step 515 and checks avatar information between the first and second identifiers, thereby determining the avatar image corresponding to the display instruction word in step 519. After that, the controller 110 stores the display instruction word in order to display the display instruction word in the form of the text message. At the same time, the controller 110 checks the avatar information corresponding to the display instruction word from the memory 130 in order to set the corresponding avatar address and the display time and stores them in the operation list.

Figure 8:
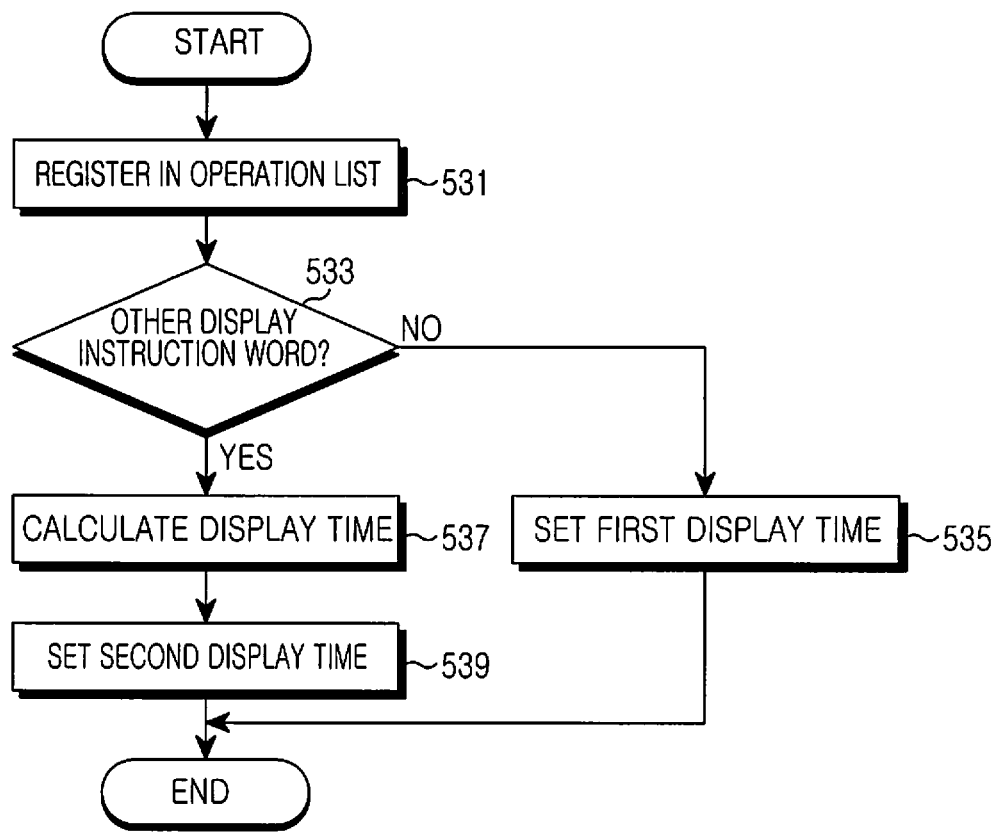
FIG. 8 is a flowchart illustrating a procedure for registering data in an operation list and setting a display time shown in FIG. 7.

FIG. 8 is a flowchart illustrating a procedure for performing step 521 shown in FIG. 7.

Referring to FIG. 8, after checking the display instruction word, the controller 110 registers the avatar information corresponding to the display instruction word in the operation list in step 531 and checks whether other display instruction words exist in the operation list in step 533. Step 533 is required in order to check whether the text message includes at least two display instruction words. If it is determined in step 533 that the other display instruction words do not exist in the operation list, it indicates that only one display instruction word exists in the avatar text message, so the controller 110 sets the display time for the avatar according to the display instruction word as a first display time in step 535. Herein, the first display time is continuously maintained while the message is being displayed. However, if it is determined in step 533 that the other display instruction words exist in the operation list, the controller 110 checks the number of display instruction words registered in the operation list, and calculates the display time for the avatars in step 537. Then, the controller 533 sets the calculated display time for the avatars as a second display time in step 539 and stores the second display time. That is, after checking the display instruction word, the controller 110 stores the avatar information (for example, an address of an avatar image stored in the memory 130) corresponding to the display instruction word and sets the display time for the avatar image when displaying the avatar text message. At this time, if only one display instruction word is registered in the operation list, the controller 110 sets the display time (first display time) so as to display one avatar image while the avatar text message is being displayed. However, if at least two display instruction words are registered in the operation list, the controller sets the display time (second display time) so as to display avatar images corresponding to the display instruction words while the received avatar text message is being displayed. At this time, the second display time may vary depending on the number of the display instruction words registered in the operation list. In addition, it is also possible to fix the second display time. The present invention will be described on the assumption that the second display time is fixed.

The wireless terminal according to an embodiment of the present invention scans the character strings of the text message while repeatedly performing the above procedures and classifies the scanned character data into general characters and display instruction words. If the scanned character data are determined as the display instruction words, the avatar information corresponding to the display instruction words is registered in the operation list and sets the display time for the avatar. When the scanning for the text message has been completed through repeatedly performing the above procedures, the controller 110 detects it in step 513 (see, FIG. 7) and returns to step 419 shown in FIG. 6.

In step 419, the controller 110 checks whether the message confirmation command is generated by the user. If the message confirmation command is generated by the user, the controller 110 detects it and displays the received avatar text message in display section 140 in step 421. Herein, the message confirmation command may be generated when the user opens a folder of the wireless terminal in response to an incoming alarm of the text message or when the user pushes a message confirmation key. However, if the message confirmation command is not generated by the user, the message processing procedure will be finished in a state that the icon representing the incoming of the avatar text message is being displayed in the display section 140.

In addition, the user can detect the incoming of the message based on the icon representing the incoming of the avatar text message, so that the user can check the received avatar text message. Such a message checking step may be performed after a predetermined time lapses from the incoming of the text message. In this case, the user of the wireless terminal checks the icon representing the incoming of the avatar text message displayed in the display section 140, and searches the receive message list from the menu, thereby generating the confirmation command for the avatar text message and confirming the avatar text message. The above procedure is identical to step 421.

Figure 9:
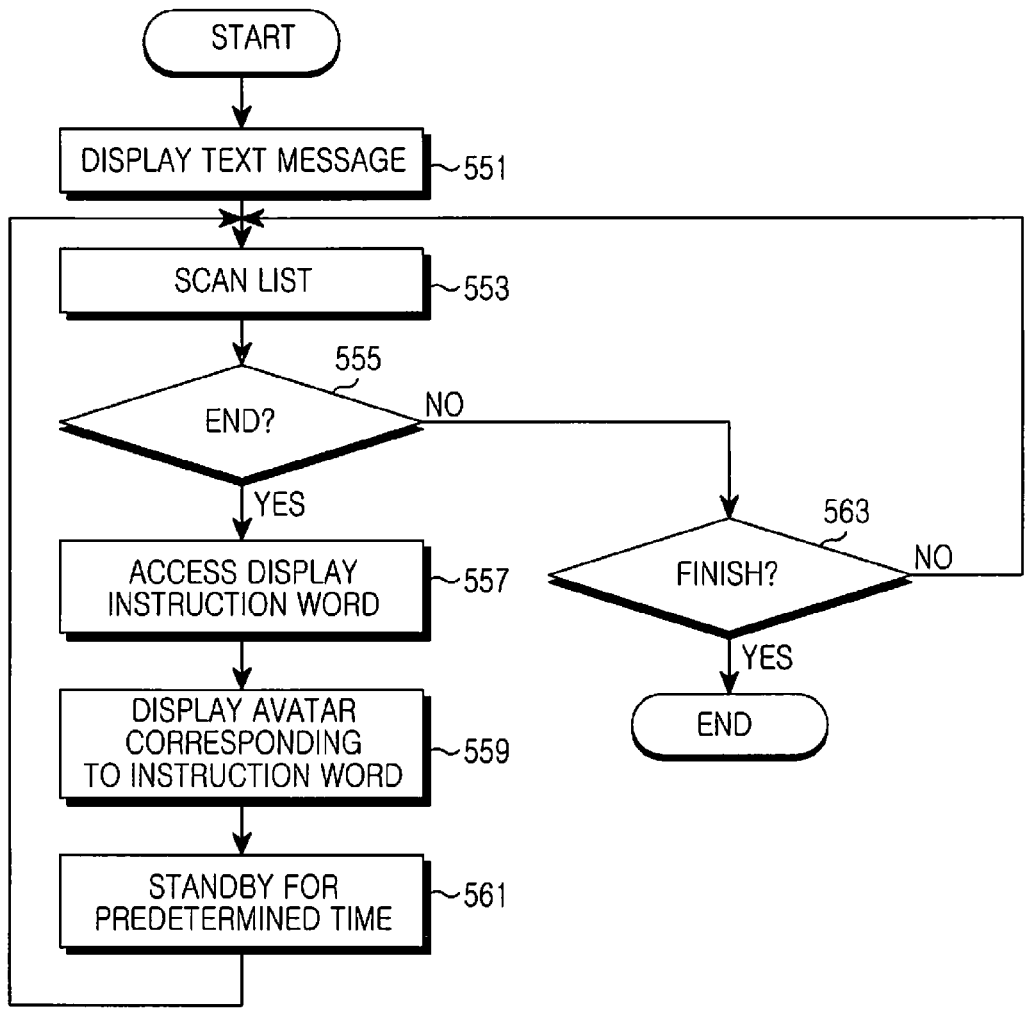
FIG. 9 is a flowchart illustrating a procedure for displaying a text message analyzed through the procedures shown in FIGS. 6 and 7.
Figure 10:
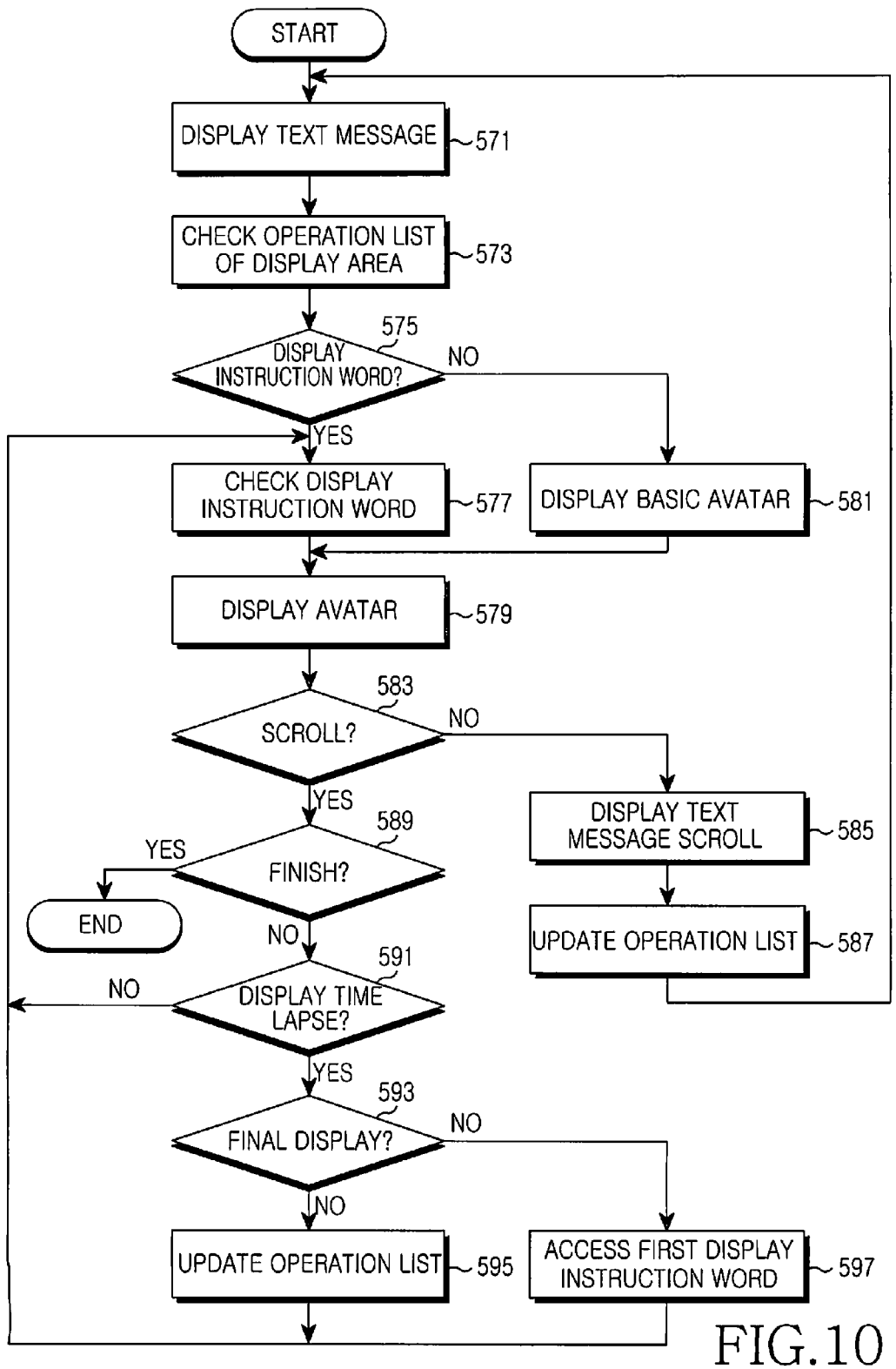
FIG. 10 is a flowchart illustrating another procedure for displaying a text message analyzed through the procedures shown in FIGS. 6 and 7.

In step 431 shown in FIG. 6, the controller 110 can display the avatar text message while performing the procedure identical to the procedure as shown in FIG. 9 or 10. FIG. 9 is a flowchart illustrating a procedure for displaying the avatar text message when it is possible to display the avatar text message a single time, and FIG. 10 is a flowchart illustrating a procedure for displaying the avatar text message several times by dividing the avatar text message into several parts. In FIG. 10, the received avatar text message is displayed while scrolling the avatar text message in a line unit.

Referring to FIG. 9, the controller 110 displays the received text message in the display section 140 in step 551. At this time, the text message can be displayed in a specific region of the display section or can be displayed with an avatar having a predetermined motion while being confined by a balloon-like symbol. In addition, it is also possible to overlay the text message on the avatar. If the text message is large in size, the text message can be displayed while scrolling the text message. Hereinafter, the present invention will be described on the assumption that the text message is displayed together with the avatar while being confined by the balloon-like symbol.

While the text message is being displayed in the display section 140, the controller 110 scans the avatar list in step 553 and accesses the avatars registered in the avatar list in step 557 in order to display the avatar in step 559. The avatar may be displayed in the display section 140 for a predetermined display time, which is set through the procedure shown in FIG. 8. When the display time lapses, step 553 is repeated so that the above procedure is repeated. If the above procedure is repeatedly carried out, avatars are sequentially displayed according to the display instruction words contained in the avatar text message. At this time, the text message is also displayed in the display section 140. In addition, when an avatar corresponding to a final instruction word registered in the avatar list has been displayed, the controller 110 checks whether a finish command is generated in step 563. If it is determined in step 563 that the finish command is not generated, the controller 110 returns to step 553 so as to repeatedly perform the above procedure by accessing the avatar for the first display instruction word registered in the avatar list. In addition, if it is determined in step 563 that the finish command is generated, the controller 110 detects it and finishes the display procedure for the text message and the avatar displayed in the display section 140.

Figure 11A:
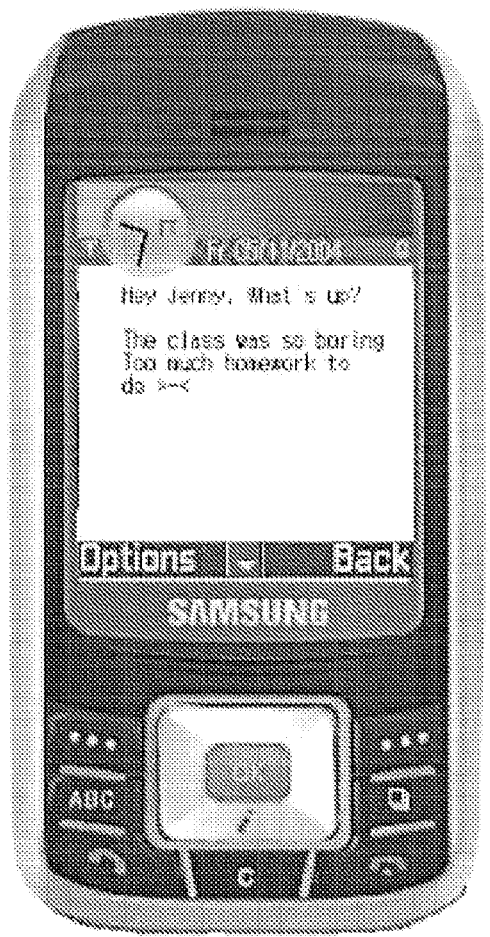
FIGS. 11A to 11N are views illustrating text messages processed through the procedure shown in FIG. 10.
Figure 11B:
Figure 11C:

FIGS. 11A to 11C are views illustrating examples of avatar text messages shown in the display section 140. It is assumed that the avatar text message has a size adaptable for a screen of the display section 140 as shown in FIG. 1A. If the avatar text message as shown in FIG. 11A has been received in the wireless terminal, avatar images corresponding to the display instruction words as shown in Table 6 are registered in the operation list of the memory 130. In Table 6, a "Display line" refers to a row of the character data displayed in the display section 140, an "Avatar" represents an address value in the memory 130 for the avatar which may be displayed in the corresponding row, and a "Display time" means a display time of the avatar. Accordingly, the value of the display line for displaying the avatar, address information of the avatar, and the display time for the avatar are registered in the operation list.

TABLE 6

| Display line | Avatar | Display time | Others (display instruction words) |
|---|---|---|---|
| L1 | | | |
| L2 | a1 | Second display time | Tired |
| L3 | | | |
| L4 | a2 | Second display time | Tease |

Therefore, upon receiving the text message as shown in FIG. 11A, the controller 110 displays the text message confined by a balloon-like symbol in the display section 140 as shown in FIG. 11B in step 551, and scans the operation list as shown in FIG. 6 through steps 553 to 557, thereby checking the avatar information with respect to the first display instruction word. After that, the controller 110 accesses the avatar in step 553 in order to display the avatar as shown in FIG. 11B. At this time, as shown in FIG. 11B, the display section 140 displays the text message together with the avatar corresponding to the first display instruction word. The avatar text message may be displayed in the display section for the second display time registered in the operation list (step 561). When the second display time lapses, the controller 110 checks the address value for the avatar image corresponding to the next display instruction word in step 553, accesses the corresponding avatar image in step 557, and displays the avatar image as shown in FIG. 11C in step 559. In addition, the avatar text message shown in FIG. 11C is also maintained for the second display time registered in the operation list. Then, the controller 110 returns to step 553 so as to check the avatar information for the next display instruction word registered in the operation list. Since the next display instruction word does not exist, the controller 110 again displays the avatar for the first display instruction word. In the above manner, the controller 110 sequentially and repeatedly accesses the avatars registered in the operation list and displays the avatars together with the text message as shown in FIGS. 11B and 11C until the confirmation command for the avatar text message is generated by the user.

The message display procedure shown in FIG. 9 is available when the received text message has a size adaptable for the screen of the display section 140 as shown in FIGS. 11B and 11C. However, the text message may have a large size which cannot be displayed in the screen of the display section 140 at a time. In this case, the controller 110 must display the avatar text message in the display section 140 by dividing the avatar text message into several parts. That is, the controller 110 must display the avatar text message in the display section 140 by scrolling the avatar text message in a screen unit or a line unit. FIG. 10 illustrates the procedure for displaying the avatar text message corresponding to the display instruction word in the display section 140 by scrolling the avatar text message in a line unit.

Figure 11D:
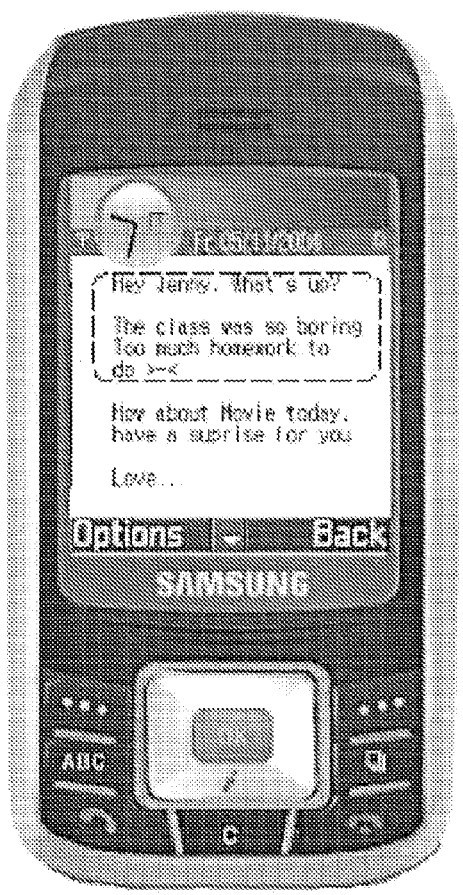

Hereinafter, the procedure for displaying the avatar text message in the display section 140 by scrolling the avatar text message in a line unit will be described with reference to FIG. 10. FIGS. 11D to 11N are views illustrating the avatar text messages displayed in the display section 140 through the procedure shown in FIG. 10. In this case, it is assumed that the avatar text message has a large size which cannot be displayed in the screen of the display section 140 at a time as shown in FIG. 11D. If the avatar text message as shown in FIG. 11C has been received in the wireless terminal, avatar images corresponding to the display instruction words as shown in Table 7 are registered in the operation list of the memory 130. In Table 7, a "Display line", an "Avatar", and a "Display time" have the same meaning as the "Display line", "Avatar", and "Display time" shown in Table 6.

TABLE 7

| Display line | Avatar | Display time | Others (display instruction word) |
|---|---|---|---|
| L1 | | | |
| L2 | a1 | Second display time | Tired |
| L3 | | | |
| L4 | a2 | Second display time | Tease |
| L5 | | | |
| L6 | a3 | Second display time | Afraid |
| L7 | | | |
| L8 | a4 | Second display time | Love |

Figure 11E:
Figure 11F:

Hereinafter, the procedure for displaying the avatar text message shown in FIG. 10 will be described with reference to FIGS. 11D to 11N. First, the controller 110 accesses the text messages having sizes adaptable for the screen of the display section 140 from among the received text messages and displays the text messages in the display section in step 571. According to one embodiment of the present invention, it is assumed that the text message having four lines can be displayed in the screen of the display section 140. In addition, an area for displaying the four-line text message will be referred to as a "display area". The controller 110 accesses the text message in a first display area and displays the text message confined by a balloon-like symbol in the display section 140 in step 571. At this time, the first display area includes L1-L4 text messages. In addition, the controller 110 checks the operation list included in the first display area in step 573. In addition, if the text message in the first display area includes the display instruction word, the controller 110 detects it in step 575, checks an avatar address value of the corresponding instruction word in step 577, and accesses the corresponding avatar stored in the memory in order to display the avatar in the display section 140 in step 579. At this time, an avatar which must be firstly displayed from among avatars shown in Table 7 is a "tired" avatar as shown in FIG. 11E. The "tired" avatar as shown in FIG. 11E is maintained for the second display time. When the second display time lapses, the controller 110 detects it in step 591 and checks whether the presently displayed avatar is for a final display instruction word included in a present display area in step 593. If it is determined in step 593 that the presently displayed avatar is not related to the final display instruction word included in the present display area, the controller 110 updates the operation list in order to select the next instruction word included in the present display area in step 595 and performs step 577. Thus, the controller 110 checks the next instruction word registered in the present display area in step 577 and displays a "tease" avatar, which is a second instruction word in the first display area, as shown in FIG. 11F. After that, if the display time lapses, the controller 110 detects it in step 591 and checks again whether the presently displayed avatar is for the final display instruction word included in the present display area in step 593. If it is determined in step 593 that the presently displayed avatar is for the final display instruction word included in the present display area, the controller 110 detects it and performs step 597. In step 597, the controller 110 updates the operation list in order to select the first instruction word included in the present display area and returns to step 577. Accordingly, if an end key or a scroll command is not generated in a state that the text message of the first display area is being displayed, the controller 110 repeatedly displays the avatar text messages as shown in FIGS. 11E and 11F in a period of the second time.

Figure 11G:
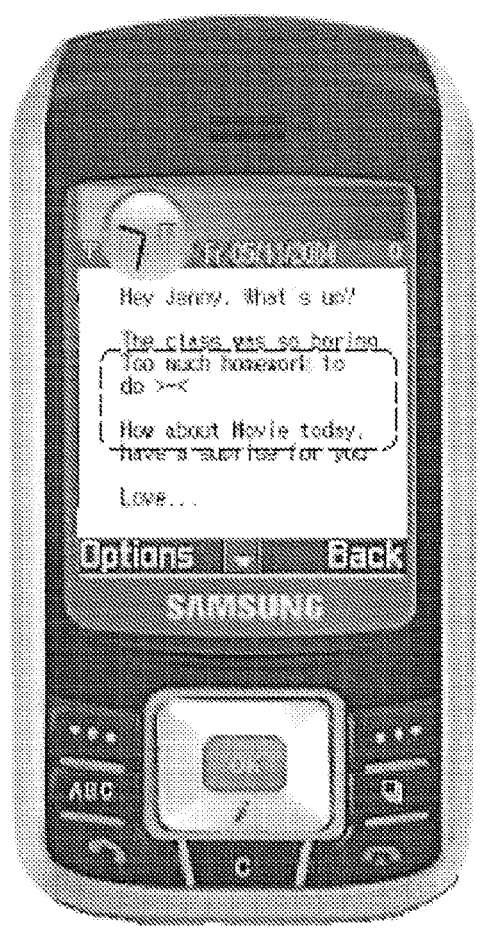
Figure 11H:

At this time, such a scrolling operation for the text message can be carried out with a predetermined time period or can be carried out according to the selection of the user. According to one embodiment of the present invention, it is assumed that the scrolling operation for the text message can be carried out according to the selection of the user. Thus, if the user sends a scrolling command, the controller 110 detects it in step 583 so that the controller 110 displays the text message by scrolling the text message in step 585 and updates the display area of the operation list in step 587. FIG. 11G shows the display area (a third display area L3-L6) when the user sends the scrolling command twice. At this time, only one display instruction word is included in the text message of the third display area as shown in Table 7. Therefore, the controller 110 displays the text message together with the "tease" avatar as shown in FIG. 11H while performing steps 577, 579, and 591. Since the third display area includes only one instruction word, the controller 110 maintains the avatar text message as shown in FIG. 1H until the next scrolling command is generated. In this case, the display time for the avatar text message is the first display time.

Figure 11I:
Figure 11J:
Figure 11K:
Figure 11L:
Figure 11M:
Figure 11N:

After that, if the user generates the scrolling command, the controller 110 detects it in step 583 so that the controller 110 displays the text message of a fourth display area (L4-L7) while updating the operation list in order to display the display instruction words of the fourth display area (L4-L7). Since the fourth display area includes two display instruction words (tease and surprise), the controller displays avatar text messages as shown in FIGS. 11J and 11K while performing the above-mentioned procedure. In addition, if the user again generates the scrolling command, the controller 110 displays the text message of a fifth display area as shown in FIG. 11I in step 581, updates the operation list such that the operation list may include the instruction words of the fifth display area in step 587, and repeatedly performs the display procedure for the avatar text message. The avatar text messages shown in the display section 140 are shown in FIGS. 11M and 11N.

After displaying the avatar text messages of the first to final display areas or while displaying the avatar text messages of the first to final display areas, if the user generates a reverse scrolling command, the controller 110 detects it in step 583. At this time, the controller 110 updates the operation list such that the operation list presents a previous display area (that is, if the final display area (L5-L8) is being displayed, the operation list presents a previous display area (L4-L7)) so as to perform the above procedure. In addition, if the user generates the scrolling command while the final display area is being displayed, the controller 110 updates the operation list so as to display the first display area.

When the text message, which does not include the display instruction word registered in the operation list, is displayed together with the avatar for the display instruction word while scrolling the text message, the controller 110 detect it in step 575. The above case means that the text message of the 4-line display area does not include the display instruction word. In this case, the controller 110 detects it in step 581 so that the controller 110 displays the text message of the corresponding display area together with a predetermined basic avatar. Herein, the predetermined basic avatar is an independent avatar, which does not correspond to the display instruction word, or a specific avatar selected from the avatars corresponding to the display instruction words.

By repeatedly performing the above procedure, the character data of the avatar text message can be displayed while scrolling the character data in a row unit or a screen unit so that the avatars for the display instruction words displayed in the screen of the display section can be sequentially displayed. In this state, if the message display finish command is generated by the user, the controller 110 detects it in step 589 so that the controller 110 finishes the display operation for the text messages and the avatars displayed in the display section 140.

As described above, according to the first embodiment of the present invention, the avatar wireless terminal creates and transmits the avatar text message by adding the avatar information to the text message. At this time, the avatar text message consists of the character data and avatar instruction word. In addition, the avatar instruction word includes an identifier, information for displaying the avatar image and data consisting of characters or symbols. Therefore, the user of the transmitting wireless terminal can transmit the text message by adding the character image to the text message, so that the text message can be variously expressed. In addition, the receiving avatar wireless terminal may display the avatar text message transmitted thereto from the transmitting wireless terminal together with the avatar image based on the avatar information. At this time, the transmitting wireless terminal can check the sort of the receiving wireless terminal so as to selectively transmit the general text message or the avatar text message according to the sort of the receiving wireless terminal.

However, such a transmission scheme may be available only when the transmitting wireless terminal is the avatar wireless terminal. Accordingly, the avatar text message service is not available if the transmitting potable terminal is general wireless terminal even if the receiving wireless terminal is the avatar wireless terminal. For this reason, it is preferred to allow the receiving wireless terminal to process the general text message in the same manner as the avatar text message. According to the second embodiment of the present invention, there is provided a procedure for checking the display instruction words included in the received text message, setting the display times for the avatars according to the checked display instruction words, and displaying the text message together with the avatars.

Figure 12:
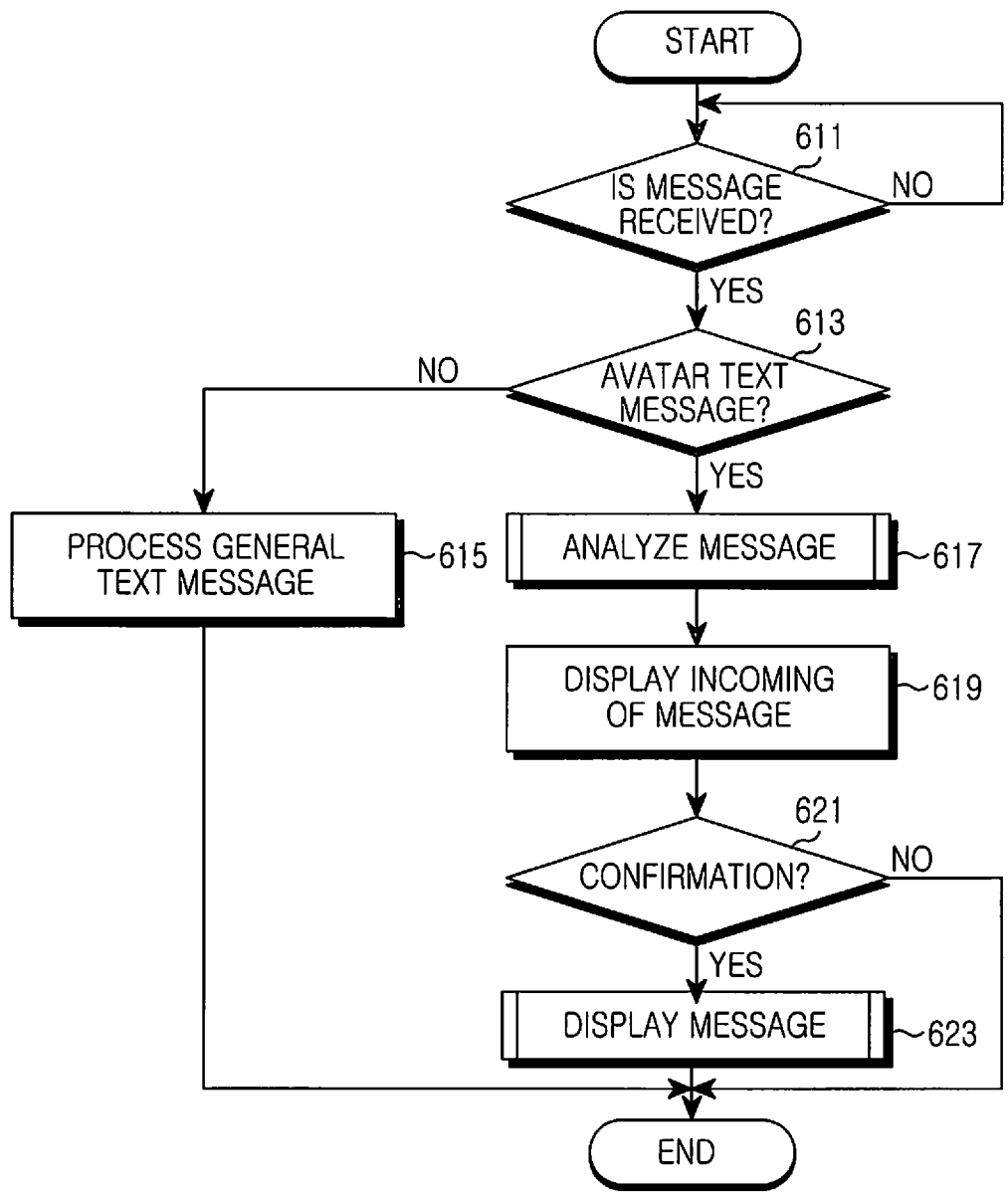
FIG. 12 is a flowchart illustrating a procedure for displaying an avatar message in a wireless terminal according to a second embodiment of the present invention.

FIG. 12 is a flowchart illustrating a procedure for processing a text message to the second embodiment of the present invention. The second embodiment of the present invention will be described on the assumption that the wireless terminal is the avatar wireless terminal, and a display scheme for the avatar text message is used. In this case, the controller 110 analyzes the content of the text message so as to detect the display instruction word for operating the avatar, that is, so as to detect whether the text message includes emoticons or avatar display characters. If it is determined that the text message includes the instruction word, the avatar is displayed. That is, the received message is displayed together with the avatar corresponding to the display instruction word.

Referring to FIG. 12, upon receiving the text message through the RF section 125 and the data processing unit 120, the controller 110 detects the incoming of the text message in step 611 and checks whether the received text message is a general text message or an avatar text message in step 613. If it is determined in step 613 that the received text message is the general text message, the controller 110 detects it and processes the general text message through a typical processing method for the general text message in step 615. That is, upon receiving the general text message, the controller 110 displays an icon notifying the user of the incoming of the general text message in the display section 140 and sounds an alarm according to a predetermined alarm mode. In addition, if the user opens a folder of the wireless terminal or selects the general text message by checking the incoming message list of the menu, the controller 110 displays the received text message in the display section 140.

However, if it is determined in step 613 that the received text message is the avatar text message, the controller 110 analyzes the received avatar text message in step 617 in order to check avatars corresponding to the display instruction words contained in the avatar text message and to register the avatars in the operation list. In addition, the controller 110 determines the display time for the registered avatars. In step 619, the controller 110 registers the avatar text messages in the receive message list of the wireless terminal and sounds an alarm for notifying the user of an incoming of the avatar text message while displaying an icon in the display section 140. The receive message list for the avatar text messages is different from a receive message list for the general text messages. However, as mentioned above, it is possible to register the avatar text messages and the general text messages in the same receive message list. In this case, the controller 110 assigns different icons to the avatar text messages and the general text messages registered in the same receive message list in such a manner that the avatar text messages can be discriminated from the general text messages. In addition, as described above, the icon notifying the user of the incoming of the avatar text message is different from the icon notifying the user of the incoming of the general text message. However, it is also possible to notify the user of the incoming of the avatar text message and the general text message by using the same icon.

In a state in which the message incoming alarm is being generated, if the user opens the folder of the wireless terminal or operates a confirmation key, the controller 110 detects it in step 621 and displays the avatar together with the text message by using the avatar information registered in the operation list in step 623. In addition, the user can select the received avatar text message from the receive message list through the menu after checking the icon representing the incoming of the avatar text message from the display section 140. At this time, the message display procedure is identical to the message display procedure shown in step 623 of FIG. 12.

Figure 13:
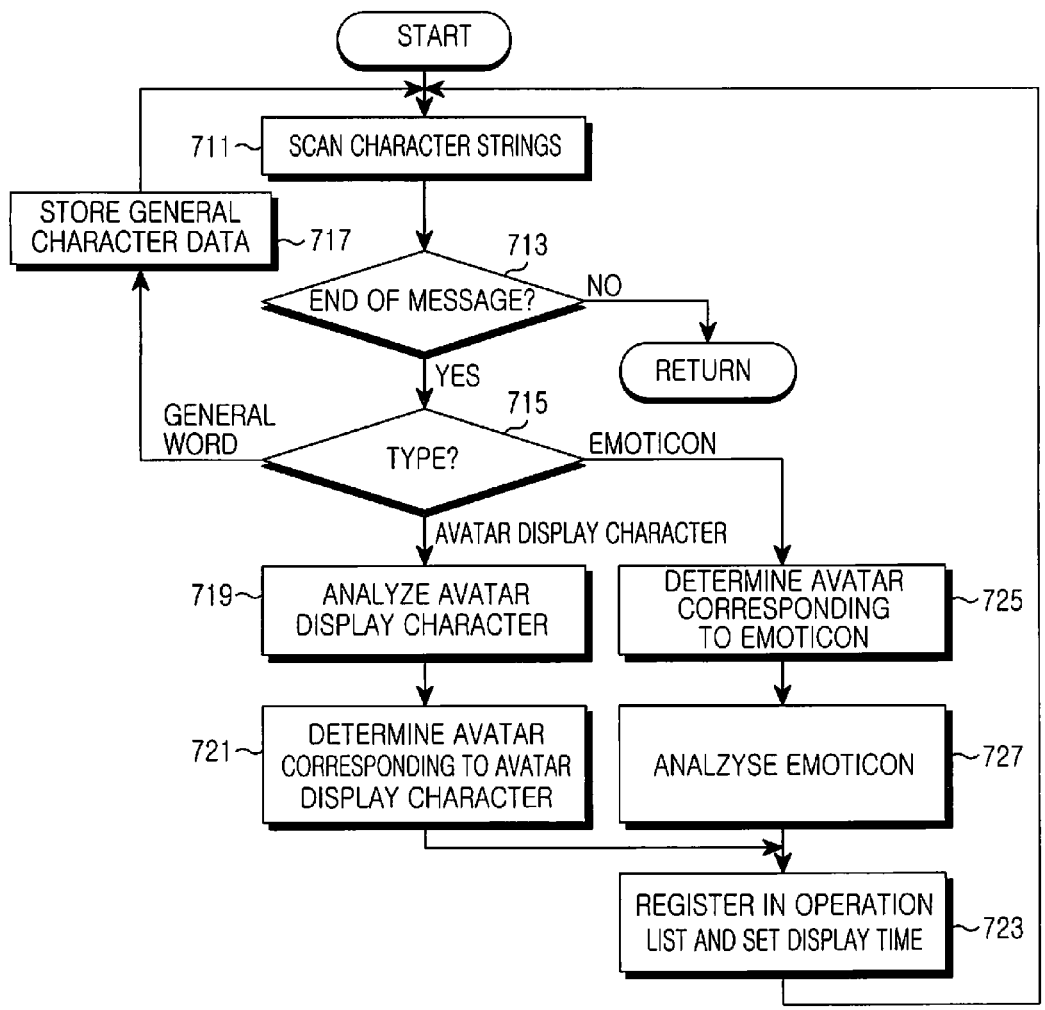
FIG. 13 is a flowchart illustrating a procedure for analyzing the content of a text message received in a wireless terminal shown in FIG. 12.

In addition, a message analyzing procedure performed in step 617 shown FIG. 12 is identical to the procedure shown in FIG. 13, and the message display procedure shown in step 623 of FIG. 12 is identical to procedures shown in FIGS. 9 and 10.

FIG. 13 is a flowchart illustrating a procedure for analyzing the content of the text message received in a wireless terminal according to one embodiment of the present invention.

Referring to FIG. 13, the controller 110 scans character strings of the text message in step 711, and checks a type of data forming the scanned character strings in step 715. At this time, the type of the data forming the scanned character strings is classified into a general word and a display instruction word. The display instruction word includes avatar display characters and emoticons. In addition, the display instruction word including the avatar display characters and emoticons is data for displaying avatars stored in the memory 130 as shown in Tables 1 to 5. That is, the controller 110 scans the character strings of the received text message and determines whether the scanned characters are avatar display instruction words while comparing the scanned characters with the avatar display instruction words as shown in Tables 1 to 5 in step 715. If it is determined in step 715 that the scanned characters are general character data, the controller 110 processes the general character data such that the general character data are displayed in the display section 140 in step 717 and returns to step 711.

However, it is determined in step 715 that the scanned characters are avatar display instruction words, the controller 110 determines avatars according to the avatar display instruction words. At this time, if it is determined that the display instruction words are character data for displaying the avatars, the controller 110 searches avatar information corresponding to the avatar display character data from the display instruction word memory of the memory 130, which has a structure as shown in Tables 1 to 5, and stores the character data in the memory 130 in step 719. In step 721, the controller 110 searches address values of avatar images corresponding to the avatar information from the avatar memory in which avatar images as shown in FIGS. 2A to 2G are stored. After that, the controller 110 registers the address values of avatar images in the operation list and sets the display time for the avatars in step 723.

If the character data are display instruction words, the controller 110 obtains the avatar information corresponding to the character data from the display instruction word memory in step 719, determines the address values of the avatar images stored in the avatar memory in step 721, sets the address, display order and display time of the selected avatar image and registers them in the avatar operation list in step 723.

In addition, if it is determined that the display instruction words are emoticons for displaying the avatars, the controller 110 searches avatar information corresponding to the emoticons from the display instruction word memory of the memory 130, which has a structure as shown in Tables 1 to 5, and stores the emoticons in the memory 130 in step 725. In step 727, the controller 110 searches address values of avatar images corresponding to the avatar information from the avatar memory in which avatar images as shown in FIGS. 2A to 2G are stored. After that, the controller 110 registers the address values of avatar images in the operation list and sets the display time for the avatars in step 723. Steps 725, 727 and 723 are similar to the procedure for processing the avatar display characters.

Step 723 is performed in the same manner as the procedure shown in FIG. 8. That is, after analyzing the display instruction words, the controller sequentially registers the avatar position information corresponding to the display instruction words in the operation list and sets the display time of the avatars by analyzing the registered display instruction words.

The controller 110 scans the character strings of the received text message while repeatedly performing the above procedure, and classifies the scanned character data into general characters, avatar display characters and emoticons. Then, if it is determined that the scanned character data are avatar display characters and emoticons, the controller 110 selects corresponding avatars so as to register the avatars in the avatar list while setting the display order and the display time for the avatars. The general characters, avatar display characters and emoticons can be stored as text messages by repeatedly performing the above procedure. In addition, avatar information with regard to the display instruction words is registered in the operation list as shown in Table 6 and 7. At this time, the display time for the avatars registered in the operation list is also stored. If all character strings of the received text message have been scanned, the controller 110 detects an end of the text message in step 713, so that the procedure is returned to step 619 shown in FIG. 12.

The avatar text message processed through the above procedure will be displayed in step 623 of FIG. 12 through the procedures shown in FIG. 9 or 10. At this time, if it is possible to display the received avatar text message in the screen of the display section 140 at a time, the operation list as shown in Table 6 can be formed and the avatar text messages as shown in FIGS. 11A to 11C can be formed through the display procedure as shown in FIG. 9. However, if it is difficult to display the received avatar text message in the screen of the display section 140 at a time, the operation list as shown in Table 7 can be formed and the avatar text messages as shown in FIGS. 11C to 11N can be formed through the display procedure as shown in FIG. 10.

Although the avatar text messages shown in FIGS. 11A to 11N are displayed in a specific area of the display section while being confined by a balloon-like symbol, it is also possible to sequentially overlay the avatars on the text message being displayed.

As mentioned above, according to the second embodiment of the present invention, avatar images corresponding to all display instruction words contained in the text message are displayed. In addition, the controller analyzes the received text message in order to select one display instruction word from among display instruction words contained in the text message and to display the text message with at least one avatar images corresponding to the selected display instruction word.

According to a third embodiment of the present invention, upon receiving the text message, the controller 110 processes the received text message and analyzes the display instruction words (that is, words or special characters representing emotional expressions) contained in the text message so as to display the text message together with the avatar images corresponding to the display instruction words. According to the present invention, the text messages include SMS messages, EMS messages, MMS messages, and other messages which can be transmitted through various transmission schemes. In addition, the text message may include various messages which can be displayed in the wireless terminal by using characters.

In addition, the display instruction words for the text messages may include emoticons and words for displaying the avatars. The avatar images having various motions must be previously stored in the avatar memory of the memory 130 and display instruction words (words and emotions) must be previously stored in the display instruction word memory of the memory 130. That is, the avatar memory and the display instruction word memory of the memory 130 may act as a file system and may include a memory (or, file system) index per each avatar. In addition, the avatar memory can store avatars having various motions, expressions and things. That is, avatar information is stored in the avatar memory such that various kinds of avatars with various motions, expressions, and things can be individually displayed. In addition, the avatar memory must store emoticons and words representing emotional expressions by analyzing the character data forming the text message. Such character data representing emotional expressions with avatars in the text message are shown in Table 8.

TABLE 8

Figure 15A:
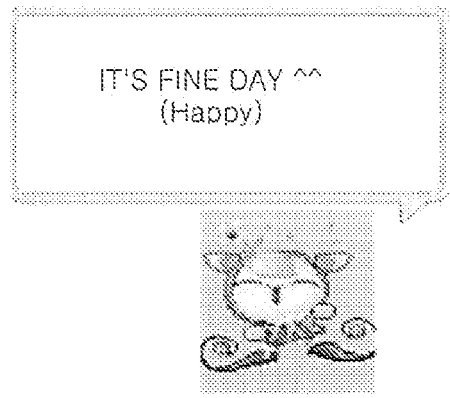
FIGS. 15A to 15E are views illustrating emotional characters displayed with text messages processed through the procedure shown in FIG. 14.
Figure 15B:
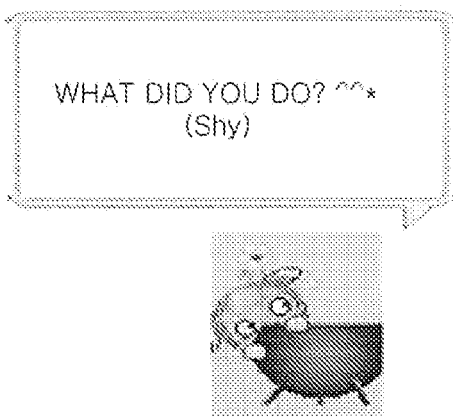
Figure 15C:
Figure 15D:
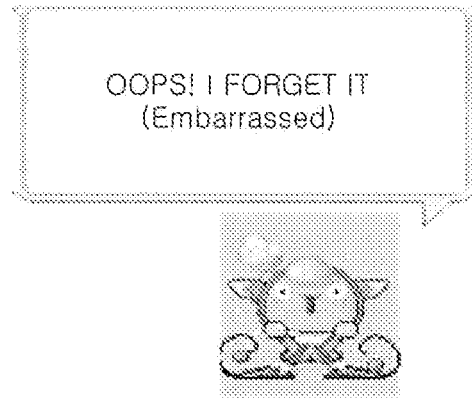
Figure 15E:
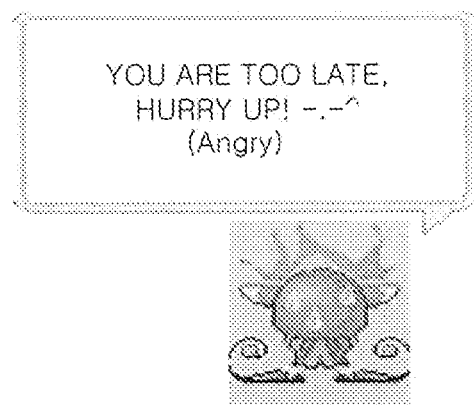

| Emotions | Emoticons | Words | Avatar images |
|---|---|---|---|
| Happy | ^^ ^.^ ^-^ ^*^ ^o^ | Love, Happy, | FIG. 15a |
|  | ^6^ | Joyful, Yaho |  |
| Shy | :^^* *^^* *^.^* | Mm~, Shy, | FIG. 15b |
|  | *^_^* *^_^* | Shyness |  |
|  | ^_^ |  |  |
| Angry | --^ -^ -_-^ | Tease, Angry, | FIG. 15e |
|  | --+(;,) | Dead |  |
| Embarrassed | -_;- 人 -=_=; | Embarrassed, | FIG. 15d |
|  | =人= | Confused, Oh, |  |
|  |  | Oops |  |
| Sad | ㅜㅜ ㅜ_ㅜ | Sad, sadness, | FIG. 15c |
|  | ㅜ-ㅜ ㅜ.ㅜ | sorrow, lonely |  |
|  | ㅜㅜㅜ_ㅜ ㅠ_ㅠ |  |  |

According to the third embodiment of the present invention, as shown in Table 8, various emotional expressions are used for indicating the emotional state of the text message. In general, such emotional expressions include happiness, anger, sorrow, and pleasure. However, according to the third embodiment of the present invention, as shown in Table 8, emotional terms of happy, shy, angry, embarrassed, and sad are used. FIGS. 15A to 15E are examples of the avatar images corresponding to the above display instruction words representing the above emotional state and are stored in the avatar memory of the memory 130. In addition, the avatar images shown in FIGS. 15A to 15E can be displayed as an image picture or an animation including a plurality of avatar images.

As mentioned above, the display instruction words shown in Table 8 are stored in the display instruction word memory of the memory 130 so as to select the avatar images shown in FIGS. 15A to 15E.

Accordingly, this embodiment of the present invention uses five emotional expressions and the display instruction words for displaying the five emotional expressions are previously set as shown in Table 8, thereby effectively displaying the emotional state of the text message. That is, the avatar images and display instruction words for representing the emotional state of the text message can be simplified so that the emotional state of the text message can be effectively displayed in the wireless terminal. In addition, some of emotional expressions and display instruction words as shown in Table 8 can be deleted or new emotional expressions and display instruction words can be added to Table 8, if necessary.

Figure 14:
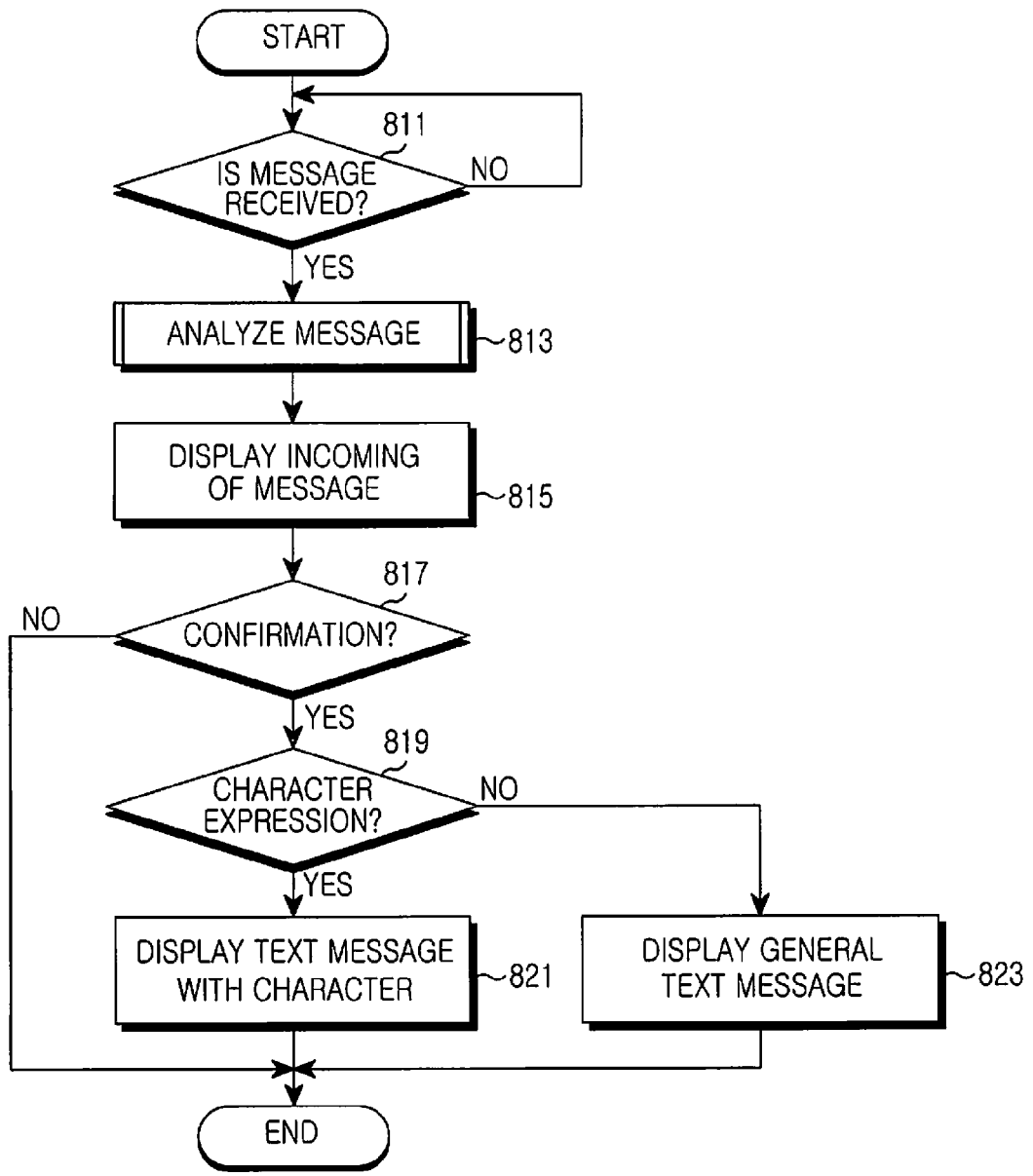
FIG. 14 is a flowchart illustrating a procedure for displaying an avatar message in a wireless terminal according to a third embodiment of the present invention.

Hereinafter, the procedure for displaying the text message together with avatar images according to display instruction words contained in the text message will be described in detail. FIG. 14 is a flowchart illustrating a procedure for displaying an avatar image by analyzing display instruction words contained in the text message in a wireless terminal according to a third embodiment of the present invention.

Referring to FIG. 14, upon receiving the text message, the controller 110 detects it in step 811, so that the controller 110 displays the received text message in the display section and analyzes data contained in the text message in order to check whether the text message includes the display instruction words in steps 813 and 815.

Herein, the message analyzing procedure may be identical to the procedure shown in FIG. 13.

First, the controller 110 parses character strings of the received text message and checks the type of the character data in the parsed character strings. At this time, the type of the character data is classified into general characters and display instruction words, such as avatar instruction words and emoticons. The avatar instruction words and emoticons are display instruction words as shown in Table 8, which are stored in the avatar memory of the memory 130 and represent emotional expressions. Thus, the controller 110 pareses the character strings of the received text message and compares the parsed character strings with the emoticons or words (character data) representing the emotional expressions as shown in Table 8, thereby determining whether the text message includes the display instruction words representing the emotional expressions. If it is determined that the text message does not include the display instruction words representing the emotional expressions, that is, if the character data are not registered in Table 8, the controller 110 displays the character data in the display section 140 by using general characters.

However, if it is determined that the text message includes the display instruction words representing the emotional expressions, the controller 110 checks the sort of the emotional expressions of the display instruction words. According to the third embodiment of the present invention, such emotional expressions may include happy, shy, angry, embarrassed, and sad as shown in Table 8. As mentioned above, some of such emotional expressions can be deleted or new emotional expressions can be added to such emotional expressions, if necessary.

The content the text message can be recognized in various ways based on the character data, which are contained in the text message and represent emotional expressions. First, the content the text message can be recognized based on the display instruction words determined by emotional words or emoticons contained in the text message. Second, the content the text message can be recognized based on the display instruction words determined by an emotional word existing in a final line of the text message or emoticons. Third, the content the text message can be recognized based on the majority of emotional words or emoticons in the display instruction words. Fourth, the content the text message can be recognized based on the emotional expression represented by an emoticon. The fourth scheme is available when only one emoticon is used for the text message. Fifth, the content the text message can be recognized based on the emotional words and emoticons contained in the text message. Sixth, the content the text message can be recognized based on the priority of the emotional expressions. In this case, the priority of the emotional expressions must be previously set and the character data contained in the text message must be analyzed for determining the priority of the emotional expressions.

The first and second schemes are available when the emotional expressions are previously appointed between the user of the transmitting wireless terminal and the user of the receiving wireless terminal. That is, when the user of the transmitting wireless terminal sends the text message to the user of the receiving wireless terminal, the user of the transmitting wireless terminal determines the present emotion of the user and inputs the display instruction word reflecting the present emotion into a front part or a rear part of the text message. Thus, the user of the receiving wireless terminal can recognize the present emotion of the user of the transmitting wireless terminal by checking the avatar image displayed when the text message is received in the receiving wireless terminal. According to the third scheme, the controller 110 of the receiving wireless terminal checks all display instruction words contained in the text message and determines the majority of the display instruction words in the text message. Then, the controller 110 accesses the avatar memory so as to display the avatar image corresponding to the major display instruction word.

Accordingly, it is possible to recognize the content of the text message through one of the first to sixth schemes by using emotional words and emoticons contained in the text message. Thus, upon receiving the text message, the controller 110 detects it in step 811 and analyzes the received text message in step 813. Such a text message analyzing step can be performed similar to the procedure shown in FIG. 13 by comparing the avatar display characters or emoticons stored in the display instruction word memory and shown in Table 8 with the received text message. In step 813, the controller 110 recognizes the content of the text message through the above procedure. At this time, the text message may include display instruction words as shown Table 8 and the avatar images corresponding to the display instruction words are stored in the avatar memory. Accordingly, the controller 110 selects display instruction words and the avatar images corresponding to the display instruction words and registers them in the operation list. After that, the controller 110 sets the display time for the avatar images. According to the third embodiment of the present invention, it is assumed that the text message may include one display instruction word positioned at a rearmost part of the text message. In this case, the controller checks the display instruction word (that is, emoticon) positioned at the rearmost part of the text message, registers an address value of the avatar image stored in the memory 130 corresponding to the display instruction word in the operation list, and sets the display time as the first display time in step 813. After that, the controller 110 sounds an alarm for notifying the user of the incoming of the text message in step 815 while displaying the icon representing the incoming of the text message in the display section 140 and registers the incoming of the text message in the receive message list.

Then, if the message confirmation request is generated by the user, the controller 110 detects it in step 817, and searches the receive message list so as to check whether the received text message includes the display instruction word representing the emotional expression in step 819. If it is determined in step 819 that received text message includes the display instruction word representing the emotional expression, the controller 110 detects the content of the text message through one of the above-mentioned first to sixth detecting schemes (that is, the second scheme since the display instruction word is positioned at the rearmost part of the text message in the third embodiment of the present invention), and displays the avatar image corresponding to the display instruction word together with the text message by accessing the avatar memory of the memory 130 in step 821. The avatar images displayed in the display section corresponding to the display instruction word are shown in FIGS. 15A to 15E. The controller 110 selects the avatar image corresponding to the display instruction word contained in the text message and displays the avatar image together with the text message in the display section 140. However, if the avatar display instruction word is not registered in the operation list, the controller 110 detects it in step 819 and displays the general text message in step 823.

As described above, according to the embodiments of the present invention, the text message received in the wireless terminal can be visually displayed with emotional characters according to the content of the text message. That is, upon receiving the text message, the wireless terminal may analyze the display instruction words having emotional expressions contained in the text message so as to display the text message together with the character images corresponding to the display instruction words. Herein, the character includes avatars. Therefore, the embodiments of the present invention can diversify functions of the wireless terminal.

While the invention has been shown and described with reference to certain preferred embodiments thereof, it should be understood by those skilled in the art that various changes in form and details may be made therein without departing from the spirit and scope of the invention as defined by the appended claims.

What is claimed is:

1. A method of creating and transmitting a text message in a wireless terminal, the method comprising the steps of:
displaying and analyzing text data inputted, when creating the text message;
adding character image information corresponding to the text data inputted to the text data inputted, and adding the text data inputted having the character image information to the text message, if the text data inputted is a character display instruction word;
adding the text data inputted to the text message, if the text data inputted is not a character display instruction word;
creating a character text message by repeatedly performing the above steps;
transmitting the created character text message; and
analyzing the display instruction words that includes the substeps of displaying an avatar image corresponding to the display instruction word, deleting the display instruction word when a delete command is generated while the avatar image is being displayed, and adding the display instruction word to the text message when a selection command is generated while the avatar image is being displayed,
wherein the text data inputted having the character display instruction word animates a character image when received by another wireless terminal.

2. The method as claimed in claim 1, wherein the character image includes the avatar image such that the text message includes an avatar text message.

3. The method as claimed in claim 2, wherein the avatar text message includes control information notifying a user of the avatar text message, character data and display instruction words, in which display instruction word identifiers and avatar image information corresponding to the display instruction words are added to front parts of the display instruction words.

4. A method of creating and transmitting a text message in a wireless terminal, the method comprising the steps of:
A) creating and transmitting a character message; and
B) receiving and displaying the character message;
wherein step A) includes the substeps of,
a) displaying and analyzing text data inputted, when creating the text message,
b) adding character image information corresponding to the text data inputted to the text data inputted, and adding the text data inputted having the character image information to the text message, if the text data inputted is a character display instruction,
c) adding the text data inputted to the text message, if the text data inputted is not a character display instruction,
d) creating a character text message by repeatedly performing the above steps, and
e) transmitting the created character text message;
wherein step B) includes the substeps of,
i) analyzing character strings of the text message upon receiving the text message so as to check whether the character strings include character display instruction words and checking avatar image information added to the display instruction words in order to register avatar images corresponding to the avatar image information in an operation list and to set a display time for the avatar images,
ii) checking the character image information contained in the character display instruction words when the character strings include the character display instruction words, registering character images corresponding to the character image information in the operation list, and storing a display time for the stored character images, and
iii) displaying the character images together with the text message for a predetermined period of time by reading the character images registered in the operation list; and
wherein the text data inputted having the character display instruction animates the character images when received by another wireless terminal.

5. The method as claimed in claim 4, wherein the text message includes control information notifying a user of an avatar text message, character data and display instruction words, in which display instruction word identifiers and the avatar image information corresponding to the display instruction words are added to front parts of the display instruction words.

6. The method as claimed in claim 4, wherein the step of analyzing the text message further includes the substeps of:
scanning the character strings of the received text message,
storing the display instruction words if the scanned data are display instruction words,
storing general character data if the scanned data are the general character data, repeating the above substeps, to set an the avatar to be displayed according to the display instruction word contained in the text message in the operation list and the display time for the avatar, and to store the general text message and the display instruction words as the text message to be displayed, and finishing the message analyzing step when the character string scan is finished.

7. The method as claimed in claim 6, wherein the step of displaying the text message includes the substeps of displaying the analyzed text message, sequentially accessing the avatars registered in the operation list while scanning the operation list, thereby displaying the avatars together with the text message for a predetermined period of time, displaying an avatar corresponding to a final display instruction word registered in the operation list while the avatar is being displayed together with the text message, sequentially displaying an avatar corresponding to a first display instruction word registered in the operation list, and finishing the message displaying step when a request for finishing a message display is generated.

8. The method as claimed in claim 7, further comprising a substep of accessing a predetermined basic avatar if the display instruction word is not registered in the operation list, thereby displaying the predetermined basic avatar together with the text message.

9. The method as claimed in claim 7, wherein the text message is displayed together with the avatar while being confined by a balloon-like symbol.

10. The method as claimed in claim 7, wherein the avatar is overlaid on the text message.

11. The method as claimed in claim 6, wherein the step of displaying the text message includes the substeps of displaying the analyzed text message in a display area of a display section, sequentially accessing the avatars registered in the operation list while scanning the operation list for the text message displayed in the display area, thereby displaying the avatars together with the text message for a predetermined period of time, scrolling the text message when a scroll command is generated during the displaying step, thereby displaying the text message in the display area of the display section while updating the operation list with the text message displayed in the display section, repeating the text message and the avatar displaying procedure while scanning the operation list updated with the text message displayed in the display section, and finishing the message displaying step when a request for finishing a message confirmation is generated.

12. The method as claimed in claim 11, further comprising the substeps of displaying an avatar corresponding to a final display instruction word registered in the operation list while the avatar is being displayed together with the text message and sequentially displaying an avatar corresponding to a first display instruction word registered in the operation list.

13. The method as claimed in claim 11, further comprising a substep of accessing a predetermined basic avatar if the display instruction word is not registered in the operation list, thereby displaying the predetermined basic avatar together with the text message.

14. The method as claimed in claim 11, wherein the text message is displayed together with the avatar while being confined by a balloon-like symbol.

15. The method as claimed in claim 11, wherein the avatar is overlaid on the text message.

16. An apparatus for displaying a text message in a wireless terminal, the apparatus comprising:
a processor;
a radio frequency (RF) communication section for receiving the text message;
a data processing section for decoding and demodulating the text message;
a character memory for storing characters having their own emotional expressions;
a character display instruction word memory for storing character display instruction words corresponding to the characters;
a controller for, when transmitting a text message, displaying and analyzing text data inputted when creating a text message, adding character image information corresponding to the text data inputted to the text data inputted, adding the text data inputted having the character image information to the text message if the text data inputted is a character display instruction, adding the text data inputted to the text message if the text data inputted is not a character display instruction, creating a character text message by repeatedly performing the above steps, transmitting the created character text message, for, when receiving a text message, comparing character strings of the decoded text message with the character display instruction words stored in the character display instruction word memory in order to select the character display instruction words contained in the text message, analyzing the display instruction words that by displaying an avatar image corresponding to the display instruction word, deleting the display instruction word when a delete command is generated while the avatar image is being displayed, adding the display instruction word to the text message when a selection command is generated while the avatar image is being displayed, and searching character images corresponding to the selected character display instruction words by accessing the character memory; and
a display section for displaying the text image output from the controller together with the character images,
wherein the text data inputted having the character display instruction animates the character image.

17. The apparatus as claimed in claim 16, wherein the character includes the avatar image.

18. The apparatus as claimed in claim 17, wherein the controller selects a first display instruction word from the text message.

19. The apparatus as claimed in claim 17, wherein the controller selects a final display instruction word from the text message.

20. The apparatus as claimed in any one of claim 19, wherein the display instruction words include emoticons.

21. The apparatus as claimed in any one of claim 19, wherein the display instruction words include instruction words for expressing happy, sad, angry, embarrassed and shy, and the avatar images represents emotional expressions corresponding to happy, sad, angry, embarrassed and shy, respectively.

22. The apparatus as claimed in claim 17, wherein the controller selects a display instruction word forming a majority from among various display instruction words contained in the text message.

* * * * *